United States Patent
Lim et al.

(10) Patent No.: US 11,522,985 B1
(45) Date of Patent: Dec. 6, 2022

(54) HINGED ELECTRONIC DEVICE WITH DISPLACEMENT ALTERING HINGE AND CORRESPONDING SYSTEMS

(71) Applicant: Motorola Mobility LLC, Chicago, IL (US)

(72) Inventors: Yong-Ho Lim, Kildeer, IL (US); Alberto R. Cavallaro, Northbrook, IL (US); Thomas Gitzinger, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/490,624

(22) Filed: Sep. 30, 2021

(51) Int. Cl.
*H04M 1/02* (2006.01)

(52) U.S. Cl.
CPC ......... *H04M 1/022* (2013.01); *H04M 1/0268* (2013.01)

(58) Field of Classification Search
CPC ..... H04M 1/0216; H04M 1/0268; G06F 1/16; G06F 1/1616; G06F 1/1681; G06F 1/1652
See application file for complete search history.

(56) References Cited

U.S. PATENT DOCUMENTS

| | | | |
|---|---|---|---|
| 7,797,795 | B2 | 9/2010 | Maatta |
| 9,848,502 | B1 * | 12/2017 | Chu ..................... G06F 1/1681 |
| 10,601,967 | B1 | 3/2020 | Harmon et al. |
| 10,782,739 | B2 | 9/2020 | Ou |
| 2020/0166974 | A1 | 5/2020 | Ai |
| 2021/0011513 | A1 * | 1/2021 | Watamura ............. G06F 1/1652 |

FOREIGN PATENT DOCUMENTS

KR    20220027710 A  *  3/2022

OTHER PUBLICATIONS

Lim, et al., "Hinged Electronic Device with Displacement Altering Hinge and Corresponding Systems", Specification and Drawings as Filed Sep. 11, 2020; Not yet published; U.S. Appl. No. 17/018,932.
Moussa, Ait , "Introduction to Mechanisms and Kinematics", University of Central Oklahoma Dept of Engineering & Physics; Chapter 1 Lecture; http://www.engineering.uco.edu/~aaitmoussa/Courses/ENGR3153/Lectures/Chapter1/chapter_1b.pdf; Unknown Publication Date but prior to filing of present application.
Le, Nhan T. , "Non-Final Office Action", U.S. Appl. No. 17/490,640, filed Sep. 30, 2021; dated Jul. 18, 2022.

* cited by examiner

*Primary Examiner* — Ankur Jain
*Assistant Examiner* — Angelica M Perez
(74) *Attorney, Agent, or Firm* — Philip H. Burrus, IV

(57) ABSTRACT

An electronic device includes first device housing and a second device housing. The hinge housing is coupled to a first hinge arm extending into to the first device housing a second hinge arm extending into the second device housing. The first hinge arm has a first pin extending from a terminal edge of the first hinge arm that engages a first slot defined by a first bracket fixedly coupled to the first device housing. The second hinge arm has a second pin extending from a terminal edge of the second hinge arm that engages a second slot defined by a second bracket fixedly coupled to the second device housing. The first pin translates with the first slot and the second pin translates within the second slot, respectively, when the first device housing and the second device housing pivot to change a displacement between the hinge housing and the device housings.

20 Claims, 14 Drawing Sheets

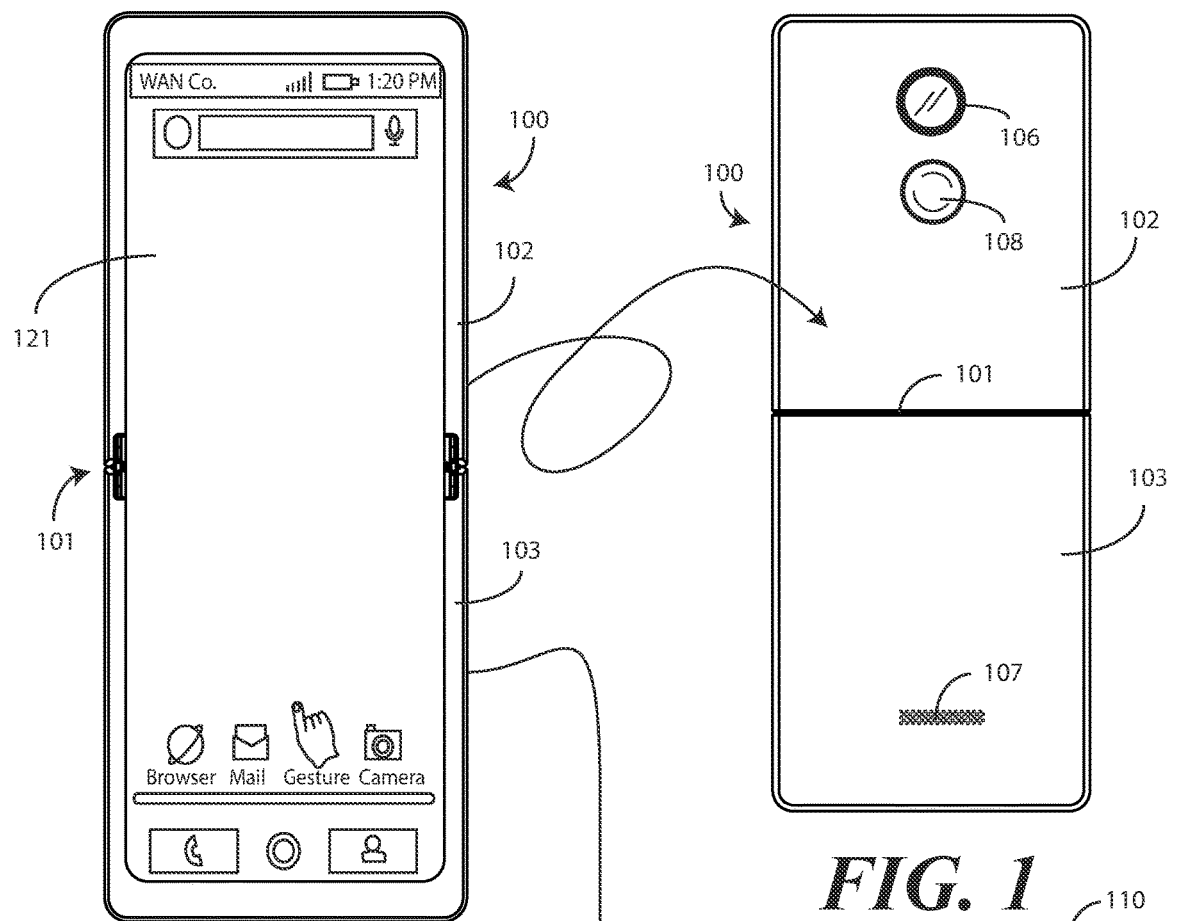
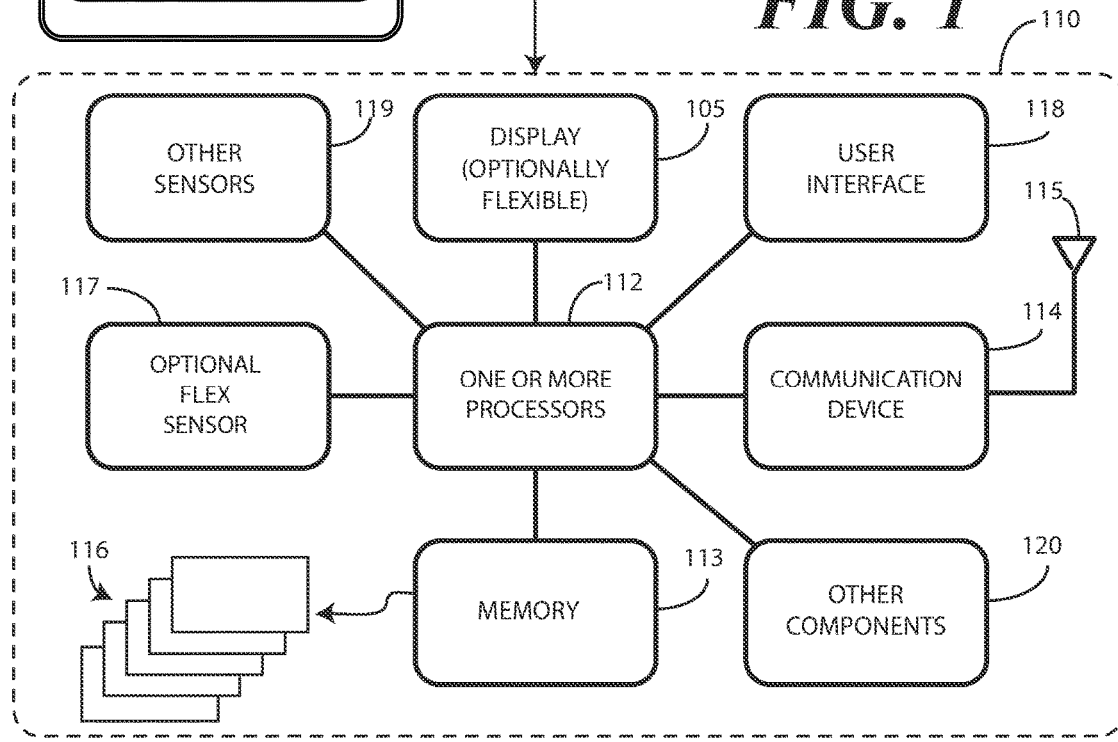
FIG. 1

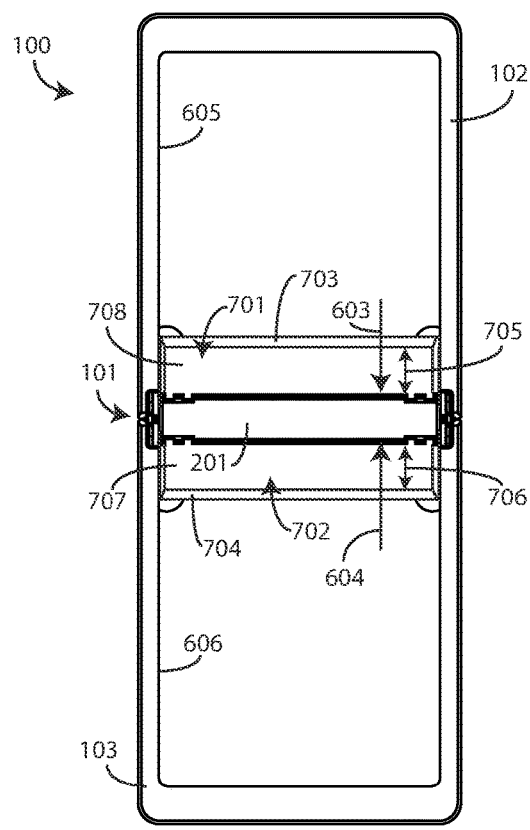
FIG. 7
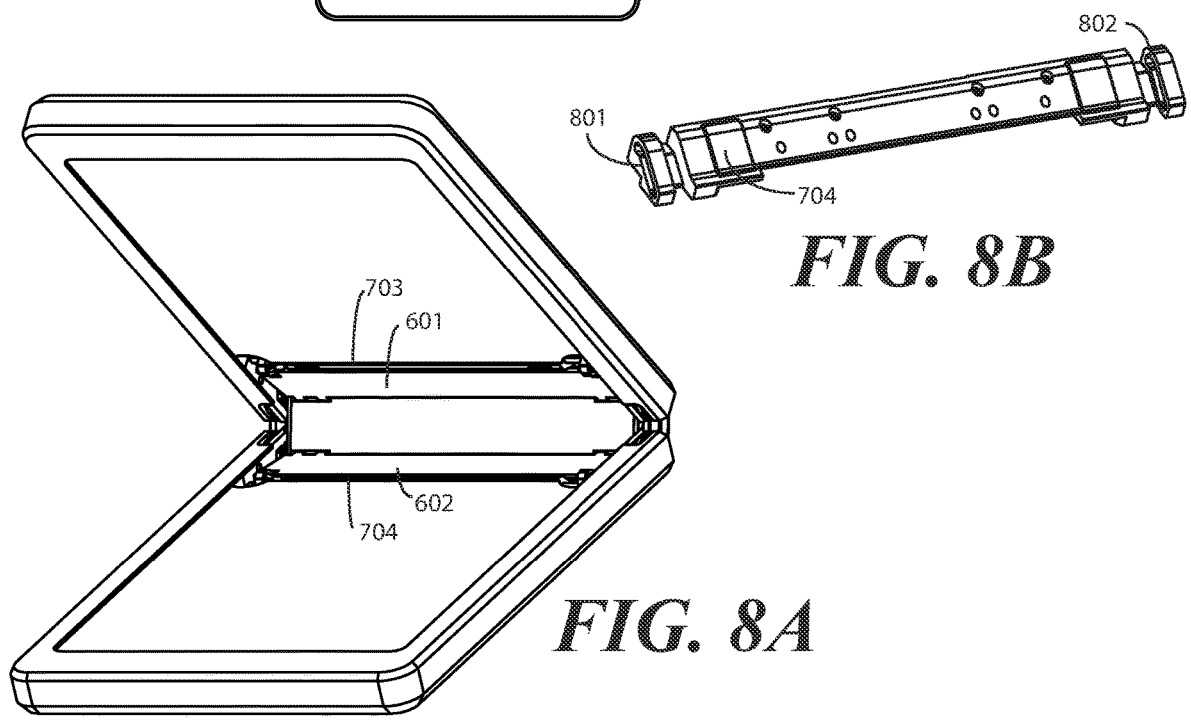
FIG. 8B
FIG. 8A

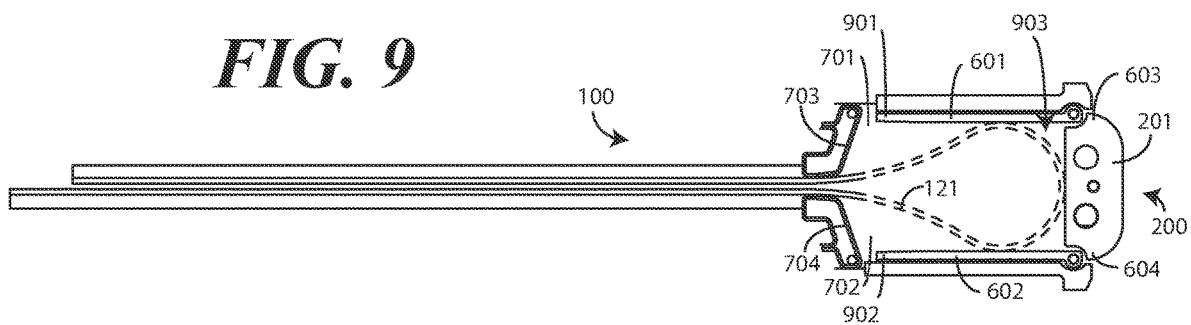
FIG. 9
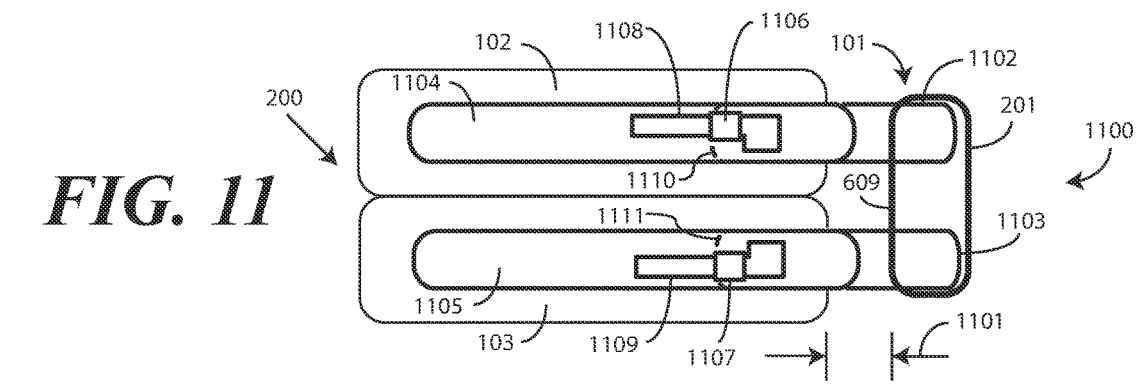
FIG. 10
FIG. 11
FIG. 12

HINGED ELECTRONIC DEVICE WITH DISPLACEMENT ALTERING HINGE AND CORRESPONDING SYSTEMS

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved hinged electronic device.

BRIEF DESCRIPTION OF THE DRAWINGS

FIG. 1 illustrates one explanatory electronic device in accordance with one or more embodiments of the disclosure.

FIG. 7 illustrates a plan view of one explanatory electronic device in accordance with embodiments of the disclosure with portions of the hinge removed so that other portions of the device housing are visible.

FIG. 8A illustrates a perspective view of one explanatory electronic device in accordance with embodiments of the disclosure in a partially open position, and with the flexible display removed so that the hinge is visible.

FIG. 8B illustrates portions of the explanatory electronic device of FIG. 8A in greater detail.

FIG. 9 illustrates a cut away view of a hinge portion of an electronic device in accordance with one or more embodiments of the disclosure when the electronic device is in the closed position.

FIG. 10 illustrates a cut away view of a hinge portion of an electronic device in accordance with one or more embodiments of the disclosure when the electronic device is in the axially displaced open position.

FIG. 11 illustrates a schematic block diagram of a hinge configured in accordance with one or more embodiments of the disclosure with the hinge in a closed position.

FIG. 12 illustrates a schematic block diagram of a hinge configured in accordance with one or more embodiments of the disclosure with the hinge in an axially displaced open position.

Figure 2:
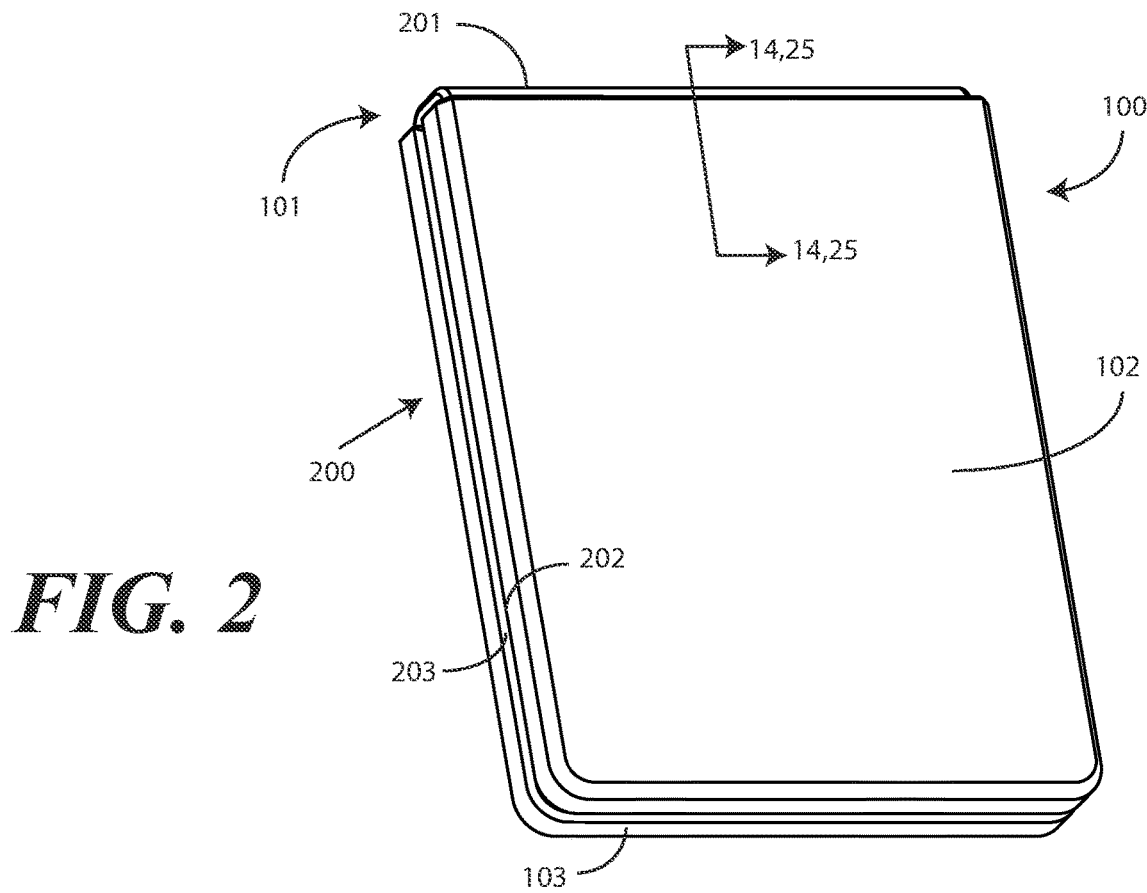
FIG. 2 illustrates a perspective view of one explanatory electronic device in accordance with one or more embodiments of the disclosure in a closed position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge assembly couples the first device housing to the second device housing so that the first device housing is pivotable about a hinge mechanism of the hinge assembly relative to the second device housing to one or more of a bent configuration, a folded configuration, or other configuration.

In one or more embodiments, a flexible display is coupled to the first device housing and the second device housing. The flexible display then spans the hinge assembly. The flexible display deforms when the first device housing pivots about the hinge assembly relative to the second device housing.

In other embodiments, the first device housing and the second device housing each have coupled thereto a separate display, which may be rigid or flexible. For example, a first display may be coupled to the first device housing on one side of the hinge assembly, while a second display is coupled to the second device housing on a second side of the hinge assembly.

In one or more embodiments, the hinge of the hinge assembly not only facilitates the bending operation, but also works to improve the reliability and usability of the flexible display. In one or more embodiments, the hinge assembly does this via the use of one or more support plates that are coupled to a hinge mechanism situated in a hinge housing. The one or more support plates are then pivotable relative to the hinge housing when the first device housing pivots about the hinge assembly relative to the second device housing.

In one or more embodiments, a first support plate is pivotally coupled to a first side of the hinge assembly. The first support plate then extends distally into the first device housing from the first side of the hinge housing. Similarly, a second support plate is pivotally coupled to a second side of the hinge assembly. The second support plate extends distally into the second device housing from the second side of the hinge housing.

The hinge assembly and its corresponding support plates serve two functions. First, they provide mechanical support for the flexible display when the first device housing has pivoted about the hinge assembly relative to the second device housing to an axially displaced open position. However, when the first device housing pivots about the hinge assembly relative to the second device housing to a closed position, where interior surfaces of the first device housing and the second device housing abut, the support plates translate along inclined planes of the hinge assembly to recede into recesses defined by the first device housing and second device housing.

Said differently, when the first device housing pivots about the hinge assembly relative to the second device housing to the closed position, the support plates move toward the exterior surfaces of the first device housing and the second device housing, thereby receding "outward" from the interior surfaces of the first device housing and the second device housing. This "collapse" of the first support plate and the second support plate creates a cavity in the hinge region of the electronic device that allows the flexible display to form a service loop when the electronic device is in the closed position. The service loop prevents the flexible display from being damaged or developing memory in the folded position when the electronic device is in the closed position.

Embodiments of the disclosure contemplate that bending operations occurring in a housing of an electronic device with a flexible display can present technical challenges. Illustrating by example, it can be difficult to provide uniform mechanical support beneath the flexible display when the electronic device is in the axially displaced open position. It can further be difficult to limit deformation due to bending operations such that the deformation occurs within a predefined radius.

Advantageously, embodiments of the disclosure provide solutions to each one of these challenges. Specifically hinges configured in accordance with one or more embodiments of the disclosure provide a solution that provides the needed system flexibility by providing support for the flexible display when in the open position, but that still allows for a large radius service loop of the flexible display to occur when the electronic device is in the closed position.

In one or more embodiments, each of the first device housing and the second device housing defines a support plate receiving recess at the hinged portion of the electronic device. In one or more embodiments, portions of the hinge assembly that situate within these support plate receiving recesses each comprise an inclined plane, which is physically separated from the hinge mechanism of the hinge assembly by a predefined distance.

A distal end of each support plate contacts the inclined plane to translate along the inclined plane when the first device housing pivots about the hinge relative to the second device housing. Thus, if a first side of a first support plate is coupled to the hinge housing, a second, distal side of the first support plate contacts the inclined plane of the hinge assembly situated in the support plate receiving recess of the first device housing. The second, distal side of the first support plate then translates along the inclined plane of the hinge assembly when the first device housing pivots about the hinge assembly relative to the second device housing. A second support plate and support plate receiving recess can be similarly configured in the second device housing.

The distal ends of each of the first support plate and the second support plate therefore travel, in one or more embodiments, along their respective inclined planes between a first position within the first device housing and the second device housing, respectively, to a second position within the first device housing and the second device housing, respectively, when the first device housing and the second device housing pivot about the hinge from an axially displaced open position to a closed position. In one or more embodiments, the support plates are closer to the flexible display when in the first position and are farther from the flexible display when in the second position. In one or more embodiments, the support plates are farther from exterior surfaces of the first device housing and the second device housing when in the first position but are closer to those outer surfaces of the first device housing and the second device housing when in the second position. This results in the second position being deeper within the first device housing and the second device housing, respectively, than the first position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted, and the flexible display will simply sit atop planar interior surfaces of the first device housing and the second device housing.

In either embodiment, when the first device housing pivots about the hinge assembly relative to the second device housing to the axially displaced, open position, the first support plate, the hinge housing, and the second support plate bridge the linear recess (or planar interior surfaces) to provide mechanical support for the flexible display. By contrast, by receding into the housings, the first support plate, the hinge housing, and the second support plate define boundaries within which the flexible display defines a service loop when the first device housing and the second device housing pivot about the hinge assembly from the axially displaced open position to a closed position.

Embodiments of the disclosure thus provide a novel hinge mechanism that properly supports a flexible display when a hinged electronic device is in the open position. Embodiments of the disclosure contemplate that the mechanical stack of the flexible display is frequently too soft or flexible to support itself. Accordingly, when the electronic device is in the axially displaced open position the support plates provide rigid support across the hinge portion of the electronic device. At the same time, the support plates recede into the housing when the electronic device is folded to allow the flexible display to form a service loop. Advantageously, the hinge assembly and corresponding support plates define kinematic linkages that move when the first device housing pivots about the hinge assembly relative to the second device housing to the closed position. As noted above, the support plates recede backwards (along the Z-axis) to provide space for the flexible display to bend into a teardrop shaped service loop.

Embodiments of the disclosure contemplate that when the flexible display is fixedly coupled to the first device housing and also fixedly coupled to the second device housing, with the first device housing, hinge, and second device housing configured to cause the flexible display to extend and become substantially planar when the first device housing and second device housing are in the axially displaced open position, the path length of the mechanical mechanism defined by the first support plate, the second support plate, and the hinge housing can be different than the path length of the flexible display when each is in the closed position. Said differently, for an electronic device configured to extend a flexible display flat when in the axially displaced open position, when the electronic device is in the closed position, the length of the service loop defined by the flexible display and the mechanical boundaries defined by the first support plate, hinge housing, and second support plate may be different.

In particular, to provide sufficient room for the service loop, the mechanical mechanism defined by the first support plate, the hinge housing, and the second support plate may be longer than the length of display that bends to define the service loop. This difference in length can be problematic in that it can result in either deformations in the service loop when the electronic device is in the closed position, or alternatively mechanical strain or unevenness in the flexible display when the electronic device is in the axially displaced open position.

While a spring-loaded plate can be used to apply tension to one end of the flexible display to compensate for the distance differential, this can cause the flexible display to "feel" like its moving when a user is delivering user input to the flexible display. Advantageously, embodiments of the disclosure provide an improved hinge mechanism that eliminates the need for any spring-loaded plate. Hinges configured in accordance with embodiments of the disclosure allow for the flexible display to be fixedly connected to the first device housing and second device housing, respectively, and to fully extend when the electronic device is in the axially displaced open position, yet form a proper service loop when the electronic device is in the closed position.

Embodiments of the disclosure accomplish this by employing a hinge mechanism that changes a displacement between a hinge housing and the first device housing and second device housing, respectively, as the first device housing and second device housing pivot about the hinge assembly between the axially displaced open position and the closed position. Effectively, hinges configured in accordance with embodiments of the disclosure cause the hinge housing of the hinge assembly to get closer to the first device housing and second device housing, respectively, when the electronic device is in the axially displaced open position, and farther from the hinge housing when the electronic device is in the closed position. This changing distance compensates for the difference between the bending length of the flexible display and the length of the mechanical mechanism supporting the flexible display.

In one or more embodiments, a hinge housing is coupled to a first hinge arm and a second hinge arm. In one or more embodiments, the first hinge arm extends into the first device housing. The first hinge arm comprises a pin extending from a terminal edge of the first hinge arm. In one or more embodiments, the pin engages a first slot defined by a first bracket that is fixedly coupled to the first device housing.

In a similar fashion, second hinge arm extends into the second device housing and comprises a pin extending from a terminal edge of the second hinge arm. In one or more embodiments, the pin engages a second slot defined by a second bracket fixedly coupled to the second device housing.

In one or more embodiments, a first bracket and a second bracket define the first slot and second slot, respectively, with the first bracket and the second bracket being fixedly coupled to the first device housing and the second device housing, respectively, by a fastener, screw, or other attachment item. By having the first bracket and the second bracket define the first slot and the second slot, these brackets can be configured as part of the hinge assembly, thereby allowing the entire hinge assembly to be attached to the first device housing and the second device housing during manufacture. However, embodiments of the disclosure are not so limited. In other embodiments, the first slot and second slot could be defined by the first device housing and second device housing, respectively, or could be defined by other elements that are coupled to the first device housing and second device housing. Still other embodiments will be obvious to those of ordinary skill in the art having the benefit of this disclosure.

In one or more embodiments, the first bracket and the second bracket serve as a "fixed" arm for the hinge assembly in that they are fixedly coupled to the first device housing and second device housing, respectively. By contrast, the first hinge arm and the second hinge arm function as a "sliding" arm for the hinge assembly due to the fact that the pins translate within translation portions of the first slot and the second slot when the first device housing and the second device housing pivot between the closed position and the axially displaced open position. Accordingly, in one or more embodiments, the first pin translates within the first slot and the second pin translates within the second slot, respectively, when the first device housing and the second device housing pivot about the hinge housing between the axially displaced open position and the closed position, thereby changing the displacement between the hinge housing and the first device housing and the second device housing. In one or more embodiments, this displacement is shorter when the first device housing and the second device housing are pivoted about the hinge housing to the axially displaced open position than when the first device housing and the second device housing are pivoted about the hinge housing to the closed position.

It is the translation of the first pin within the first slot and the second pin within the second slot that occurs when the hinge pivots that changes the displacement between the hinge housing and the first device housing and the second device housing. Effectively, the first hinge arm and the second hinge arm translate into the first device housing and the second device housing, respectively, when the first device housing and the second device housing pivot to the axially displaced open position. By contrast, the first hinge arm and the second hinge arm translate out of the first device housing and second device housing when the first device housing and second device housing pivot to the closed position.

In one or more embodiments, this allows an interior face of the hinge housing to be positioned farther from the first device housing and the second device housing, respectively, when the first device housing is pivoted about the hinge housing relative to the second device housing to the closed position than when the first device housing is pivoted about the hinge housing relative to the second device housing to the axially displaced open position.

This change in displacement advantageously compensates for the distance in the bending length of the flexible display and the length of the mechanical support. This also eliminates the need for any spring-loaded plate or other tensioning mechanism to be included. Moreover, it allows ends of the flexible display to be fixedly coupled to the first device housing and second device housing, respectively, thereby providing a more rigid and stable feel for users interacting with the flexible display using touch input. Other advantages of embodiments of the disclosure will be explained below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge assembly 101 couples the first device housing 102 to the second device housing 103. In one or more embodiments, the first device housing 102 is selectively pivotable about the hinge assembly 101 relative to the second device housing 103. For example, in one or more embodiments the first device housing 102 is selectively pivotable about the hinge assembly 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge assembly. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface 118 of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 121. This allows the display 105 to be flexible so as to deform when the first device housing 102 pivots about the hinge assembly 101 relative to the second device housing 103. However, it should be noted that other types of displays suitable for use with the electronic device 100 will be obvious to those of ordinary skill in the art having the benefit of this disclosure. Illustrating by example, as will be described in more detail with reference to FIG. 27 below, in other embodiments multiple displays can be used. For instance, a first rigid display can be coupled to the first device housing 102, while a second, separate rigid display can be coupled to the second device housing 103, with the hinge assembly 101 separating the two displays.

Where a flexible display 121 is used, in one or more embodiments an OLED is constructed on flexible plastic substrates can allow the flexible display 121 to bend with various bending radii. For example, some embodiments allow bending radii as small as 3.8 millimeters. Embodiments of the disclosure contemplate that flexible displays will soon be able to bend—without damage or memory artifacts—with bending radii as small as three millimeters.

In one or more embodiments the flexible display 121 may be formed from multiple layers of flexible material such as flexible sheets of polymer or other materials. In this illustrative embodiment, the flexible display 121 is fixedly coupled to the first device housing 102 and the second device housing 103. The flexible display 121 spans the hinge assembly 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well.

In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100. Various components can be electrically coupled together by conductors or a bus disposed along one or more printed circuit boards.

For example, some components of the block diagram schematic 110 can be configured as a first electronic circuit fixedly situated within the first device housing 102, while other components of the block diagram schematic 110 can be configured as a second electronic circuit fixedly situated within the second device housing 103. A flexible substrate can then span the hinge assembly 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 3:
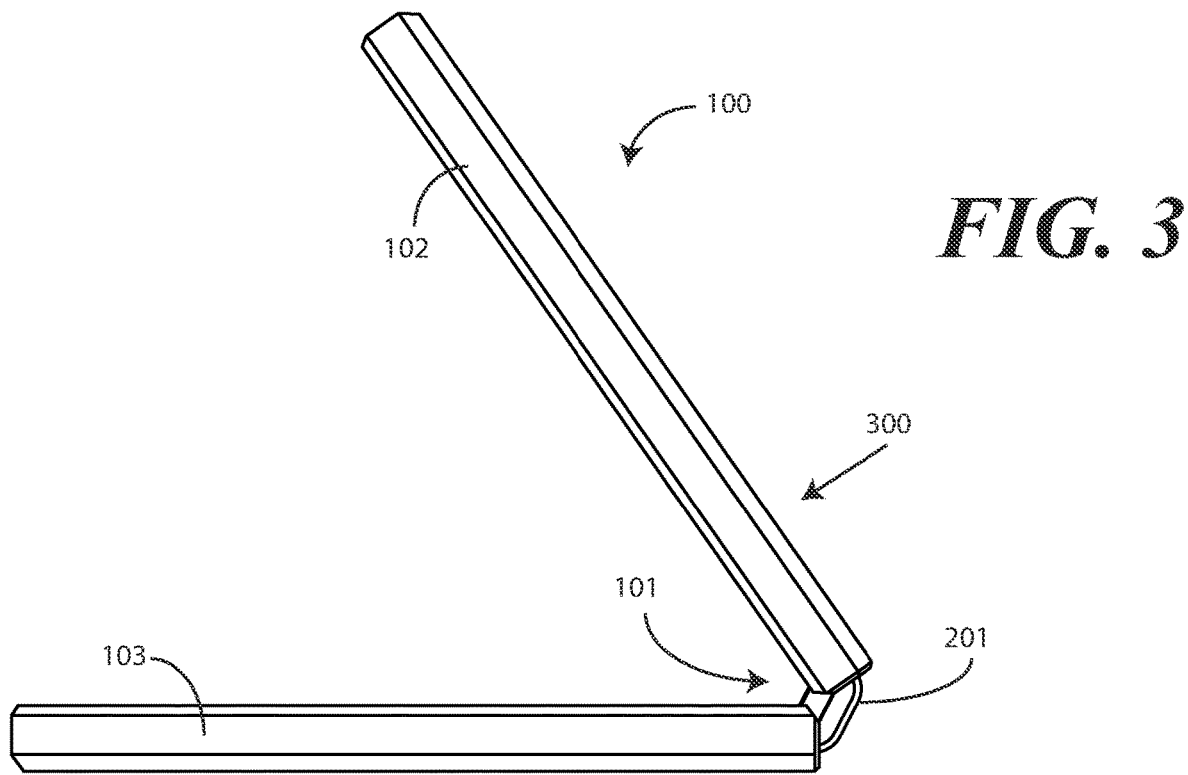
FIG. 3 illustrates a side elevation view of one explanatory electronic device in accordance with one or more embodiments of the disclosure in a partially open position.

In one embodiment, the electronic device 100 optionally includes one or more flex sensors 117, operable with the one or more processors 112, to detect a bending operation that causes the first device housing 102 to pivot about the hinge assembly 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure. Illustrating by example, the electronic device 100 of FIG. 1 includes a single flexible display 121. By contrast, another embodiment shown below in FIG. 27 includes two separate and distinct displays, and so forth. Additionally, as will be described in more detail below, some embodiments include support plates that are pivotally coupled to a hinge housing of the hinge assembly 101. In other embodiments, these support plates will be omitted.

Turning now to FIG. 2, illustrated therein is the electronic device 100 in a closed state. In this state, the first device housing 102 has been pivoted about the hinge assembly 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge of the hinge assembly 101 is revealed when the electronic device 100 is in the closed position 200.

In other embodiments, the hinge housing 201 will remain concealed when the first device housing 102 pivots about the hinge assembly 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge assembly 101 to retain the first device housing 102 and the second device housing 103 in a particular position. A stator motor could be integrated into the hinge assembly 101 as well. Still other mechanical structures and devices suitable for retaining the electronic device 100 in the closed position 200 will be obvious to those of ordinary skill in the art having the benefit of this disclosure. As will be described below, in other embodiments retention devices can be omitted due to the fact that torsion springs used in combination with a cam having mechanical detents and a stator with mechanical protrusions are used.

Turning now to FIG. 3, the electronic device 100 is shown being transitioned from the closed position (200) of FIG. 2 to a partially open position 300. Specifically, the first device housing 102 is pivoting about the hinge assembly 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figures 4, 5:
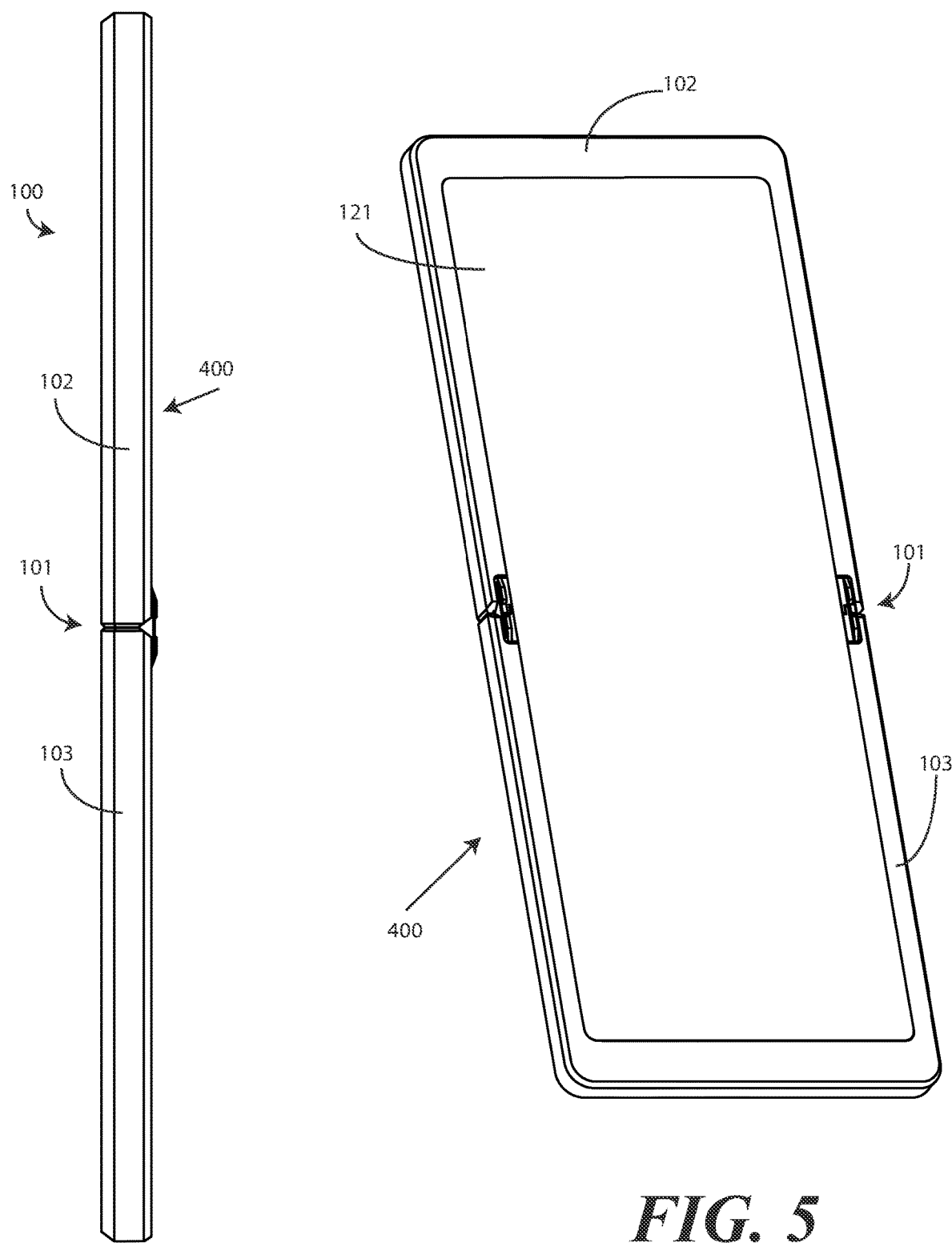
FIG. 4 illustrates a side elevation view of one explanatory electronic device in accordance with one or more embodiments of the disclosure in an axially displaced open position.
FIG. 5 illustrates a perspective view of one explanatory electronic device in accordance with one or more embodiments of the disclosure in the axially displaced open position.

Turning now to FIGS. 4 and 5, illustrated therein is the electronic device 100 in an axially displaced open position 400. In the axially displaced open position 400, the first device housing 102 is rotated about the hinge assembly 101 so as to be axially displaced 180-degrees out of phase with the second device housing 103, thereby revealing the flexible display 121 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 121, the flexible display 121 has been elongated into a flat position.

Figure 6:
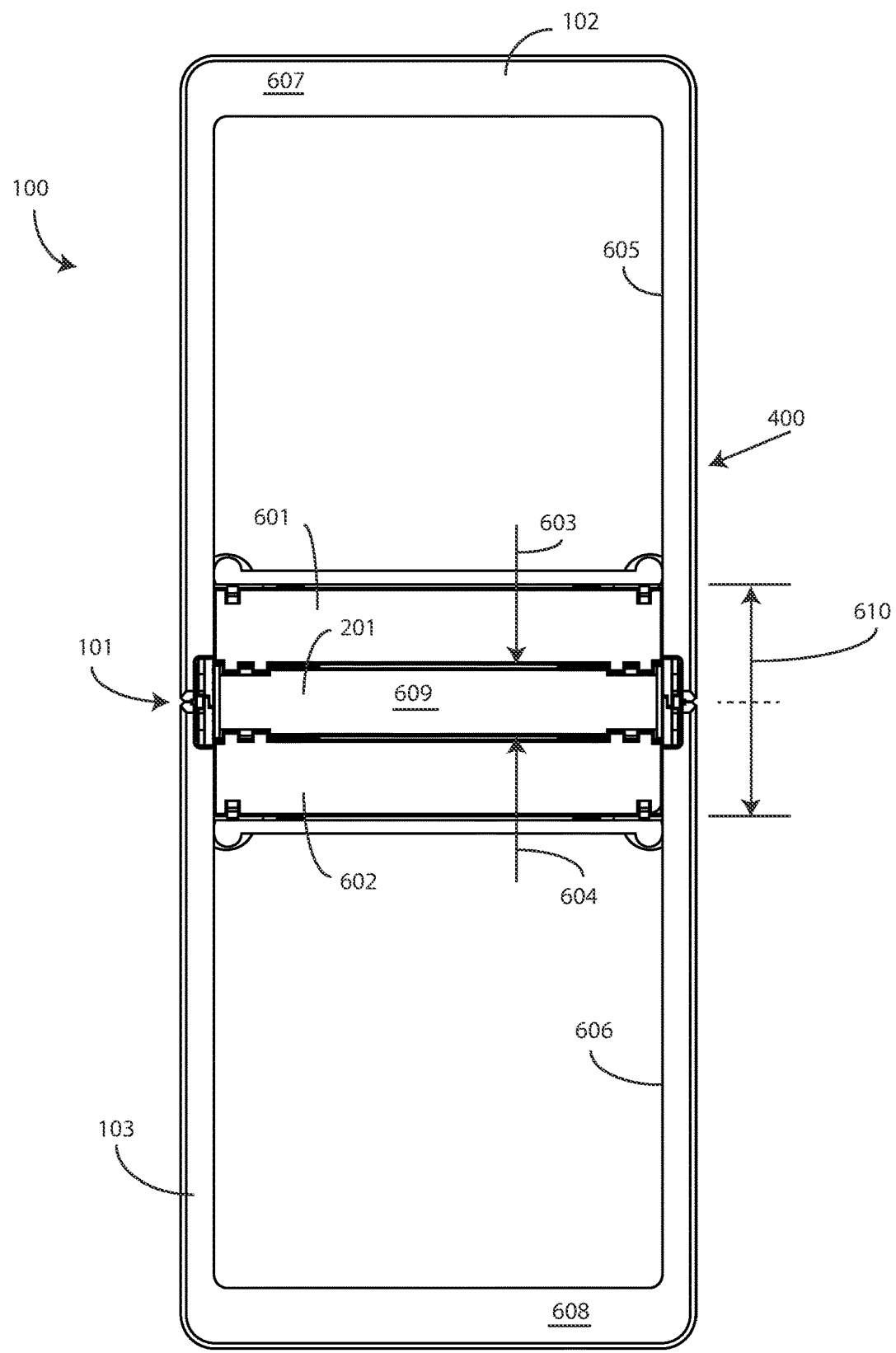
FIG. 6 illustrates a plan view of one explanatory electronic device in accordance with embodiments of the disclosure with the flexible display removed so that the hinge is visible.

Turning now to FIG. 6, the electronic device 100 is shown with the flexible display (121), as well as any overlaying fascia, removed so that additional details of the hinge assembly 101 can more readily be seen. As shown in FIG. 6, in one or more embodiments the hinge assembly 101 includes a hinge housing 201, which can link the first device housing 102 to the second device housing 103.

In one or more embodiments, the hinge assembly 101 is configured as a complete part that can be coupled to the first device housing 102 and the second device housing 103. This means that the various components of the hinge assembly 101 that will be described below, including brackets, support plates, hinge arms, the hinge housing 201, and other components are assembled as a singular hinge assembly component. The portions of this singular hinge assembly component that attach to the first device housing 102 and the second device housing 103, one example of which described below are brackets, can then be coupled to the first device housing 102 and the second device housing 103 to couple the first device housing 102, the second device housing 103, and the hinge assembly 101 together as a working electronic device 100.

In other embodiments, these components can be distributed between the hinge assembly 101, the first device housing 102, and the second device housing 103. Illustrating by example, rather than using brackets that are integrated into a singular hinge assembly, the brackets may be components of, or attached to, the first device housing 102 and second device housing 103, with other elements such as hinge arms being components of the hinge assembly 101 that engage slots or other features of the first device housing 102 and second device housing 103, respectively when assembling the electronic device 100. Other configurations will be obvious to those of ordinary skill in the art having the benefit of this disclosure.

The hinge assembly 101 of the hinge housing 201 can further include one or more pivot centers for the components that are pivotally attached to the hinge assembly 101, thereby allowing the first device housing 102 to pivot about the hinge assembly 101, which includes the hinge housing 201, relative to the second device housing 103.

Optionally, as will be described in more detail below, one or more support plates can be included to translate within the first device housing 102 and the second device housing 103, respectively. The use of such support plates is advantageous when the flexible display 121 used in the electronic device 100. However, where rigid displays are used, such as in the embodiment of FIG. 27, the support plates can be omitted.

In this illustrative embodiment, a first support plate 601 is pivotally coupled to a first side 603 of the hinge housing 201. The first support plate 601 extends distally into the first device housing 102 from the first side 603 of the hinge housing 201. A second support plate 602 is then pivotally coupled to a second side 604 of the hinge housing 201. The second support plate 602 then extends distally into the second device housing 103 from the second side 604 of the hinge housing 201.

In one or more embodiments, the first device housing 102 and the second device housing 103 each define linear recesses 605,606 into which a display (105)—be it a flexible display (121) or rigid display—may be positioned. In one or more embodiments where a flexible display (121) is used, the flexible display (121) is positioned within the linear recess 605 of the first device housing 102 and the linear recess 606 of the second device housing 103 so that it—or a fascia disposed atop the flexible display (121)—sits flush with the interior surface 607 of the first device housing 102 and the interior surface 608 of the second device housing 103. Where a flexible display (121) is used, the flexible display (121) will span the hinge assembly 101 by passing across the hinge housing 201 in such an embodiment.

By contrast, where two displays are used (as shown below in FIG. 27), a first display can be positioned within the linear recess 605 of the first device housing 102. A second display can then be positioned in the linear recess 606 of the second device housing 103. This allows each display—or a fascia disposed atop each display—to sit flush with the interior surface 607 of the first device housing 102 and the interior surface 608 of the second device housing 103. Where two displays are used, the hinge assembly 101 and hinge housing 201 will separate one display from the other. The hinge housing 201 of such an embodiment can be made narrower than that shown in FIG. 6 due to the fact that it need not provide mechanical support for a display as is the case when the display is a flexible display (121).

In still other embodiments, the linear recess 605,606 will be omitted. The display(s), whether flexible or not, as well as any accompanying fascia, may then simply sit atop planar surfaces defined by the interior surface 607 of the first device housing 102 and the interior surface 608 of the second device housing 103.

Where the linear recesses 605,606 are included and a flexible display (121) is used, the flexible display (121) can be positioned within these linear recesses 605,606 to span the hinge assembly 101 and hinge housing 201. Regardless of whether the linear recesses 605,606 are included, when the first device housing 102 pivots about the hinge assembly 101 and hinge housing 201 relative to the second device housing 103 to the axially displaced open position 400 shown in FIG. 6, the first support plate 601, the hinge housing 201, and the second support plate 602 bridge the linear recesses 605,606 (or planar interior surfaces in the other embodiment) to provide positive mechanical support for the flexible display (121).

Where electrical components, e.g., processors, memories, communication circuits, and other components described in the block diagram schematic (110) of FIG. 1 are positioned in each of the first device housing 102 and the second device housing 103, a flexible substrate can be included to electrically couple these components together across the hinge assembly 101 and through the hinge housing 201. Illustrating by example, in one or more embodiments the hinge housing 201 can include a crescent shaped duct through which the flexible substrate can pass. In one or more embodiments, the flexible substrate, which can bend as the first device housing 102 and the second device housing 103 pivot about the hinge assembly 101 to the closed position (200) of FIG. 2, allows electrical signals to pass back and forth between circuit components disposed in the first device housing 102 and the second device housing 103.

In one or more embodiments, one or more spring-loaded trays can be included within one or both of the first device housing 102 or the second device housing 103. Illustrating by example, a spring-loaded and slidable tray can be disposed within the first device housing 102. One example of such a solution is described in commonly assigned U.S. Pat. No. 10,491,725 to Harmon et al., entitled "Hinged Electronic Device with Moving Support Plates for a Flexible Display and Corresponding Systems," which is incorporated herein by reference. Alternatively, the tray could be disposed in the second device housing 103. Additionally, in other embodiments both the first device housing 102 and the second device housing 103 could include trays as well.

In one or more embodiments, a first end of a flexible display (121) can be fixedly coupled to the second device housing 103. The second end of the flexible display (121) can then be coupled to the sliding tray. In one or more embodiments, the tray is slidably coupled to the first device housing 102 and is biased away from the hinge assembly 101 and hinge housing 201 by a spring. It should be noted that while a spring is used to bias the tray away from the hinge assembly 101 and hinge housing 201 in some embodiments, in other embodiments the spring can be replaced by a damper device or other equivalent. Where configured as a damper device, the damper device can include a spring with a nested shock damper, which can be pneumatic or hydraulic, to dampen the action of the spring. Other devices suitable for use instead of the spring will be obvious to those of ordinary skill in the art having the benefit of this disclosure.

Where a tray is included, the spring(s) can operably bias the tray away from the hinge assembly 101 to flatten the flexible display (121) when the first device housing 102 pivots about the hinge assembly 101 away from the second device housing 103 to the open position 400. A first end of the flexible display (121) can be coupled to the second device housing 103, while a second end is coupled to the tray. In one or more embodiments, the spring biases the tray away from the hinge assembly 101, and thus away from the second device housing 103, to remove slack from the flexible display (121) when the first device housing 102 is pivoted about the hinge assembly 101 toward the second device housing 103 to the closed position (200) of FIG. 2.

While inclusion of a spring-loaded tray works well in practice, the inclusion of a tray, with one end of the display (105) coupled thereto, can cause a flexible display (121) to "feel" like its moving when a user is delivering user input to the flexible display (121). To eliminate this tactile artifact, and to provide for more display stability when a user is interacting with the flexible display (121) with a finger or stylus, in the illustrative embodiment of FIG. 6 the hinge assembly 101 is configured to alter a displacement 610 between the hinge housing 201 and the first device housing 102 and second device housing 103, respectively, when the first device housing 102 and the second device housing 103 pivot about the hinge housing 201 between the axially displaced open position 400 of FIG. 6 and the closed position (200) of FIG. 2.

Advantageously, this changing of the displacement 610 eliminates the need for any spring-loaded tray, as it allows the flexible display (121) to be fixedly coupled to the first device housing 102 and the second device housing 103, respectively. Moreover, the flexible display 121 can fully extend when the electronic device 100 is in the axially displaced open position 400 of FIG. 6, while still forming a proper service loop (shown, for example in FIG. 9 below) when the electronic device 100 is in the closed position (200).

Effectively, the hinge assembly 101 of FIG. 6 causes the hinge housing 201 to get closer to the interior ends of the first device housing 102 and second device housing 103, respectively, when the electronic device 100 is in the axially displaced open position 400, while moving the hinge housing 201 farther from these interior ends of the first device housing 102 and second device housing 103, respectively, when the electronic device 100 is in the closed position (200). This changing distance, represented by displacement 610 in FIG. 6, compensates for the difference between the length of the flexible display (121) that bends when the first device housing 102 pivots about the hinge assembly 101 relative to the second device housing 103 to the closed position (200) and the length of the mechanical mechanism supporting the flexible display (121) that is defined by the first support plate 601, the second support plate 602, and the hinge housing 201. This change in displacement 610 causes an interior surface 609 of the hinge housing 201 to be positioned farther from the first device housing 102 and the second device housing 103, respectively, when the first device housing 102 is pivoted about the hinge housing 201 relative to the second device housing 103 to the closed position (200) than when the first device housing 102 is pivoted about the hinge housing 201 relative to the second device housing 103 to the axially displaced open position 400. How this occurs will be illustrated in more detail below with reference to FIGS. 13-26.

Turning now to FIG. 7, illustrated therein is another view of the electronic device 100 is shown with the first support plate (601) and the second support plate (602) removed so that additional details illustrating operation of the hinge assembly (101) can more readily be seen. As shown in FIG. 7, in one or more embodiments each of the first device housing 102 and the second device housing 103 define a first chamber 701 and a second chamber 702, respectively.

In this illustrative embodiment, the first chamber 701 of the first device housing 102 is disposed to a first side 603 of the hinge housing 201, while the second chamber 702 of the second device housing 103 is disposed to the second side 604 of the hinge housing 201. The hinge housing 201 then separates the first chamber 701 defined by the first device housing 102 from the second chamber 702 defined by the second device housing 103.

In one or more embodiments, the first chamber 701 and the second chamber 702 provide recessed, open space within the first device housing 102 and the second device housing 103, respectively, that allows the flexible display (121) room to form a service loop when the first device housing 102 and the second device housing 103 pivot about the hinge assembly 101 to the closed position (200). One example of such a service loop will be shown below with reference to FIG. 9. This service loop occurs due to the fact that the flexible display (121) deforms when the first device housing 102 pivots about the hinge assembly 101 relative to the second device housing 103 from the axially displaced open position 400 to the closed position (200).

For ease of illustration, in FIG. 7 each of the first chamber 701 and the second chamber 702 comprises an inclined plane 703,704. These inclined planes 703,704 are shown being defined by the first device housing 102 and the second device housing 103 in FIG. 7. While they can be defined by these device housings, as will be described below with reference to FIGS. 13-26 in other embodiments the inclined planes 703,704 are instead defined by a first support plate engaging ramp of the hinge assembly 101 and a second support plate engaging ramp of the hinge assembly. By incorporating these inclined planes 703,704 into components of the hinge assembly 101 rather than the first device housing 102 and the second device housing 103, assembly of the electronic device 100 becomes easier and issues with mechanical tolerances become fewer. However, since FIG. 7 illustrates a more simplistic design, and as FIGS. 13-26 below illustrate an embodiment where the inclined planes 703,704 are integrated into the hinge assembly 101, FIG. 7 provides a nice introduction to how the inclined planes 703,704 function.

In this illustrative embodiment, the first chamber 701 defines an inclined plane 703 that is disposed distally a predefined distance 705 across a bottom surface 707 of the first chamber 701 from the hinge housing 201. Similarly, the second chamber 702 defines an inclined plane 704 that is disposed distally a predefined distance 706 across a bottom surface 708 of the second chamber 702 from the hinge housing 201.

In this illustrative embodiment, the first device housing 102 and the second device housing 103 each define linear recesses 605,606 into which a display (105) may be positioned. In such an embodiment, each of the first chamber 701 and the second chamber 702 is disposed between a respective linear recess 605,606 and the hinge assembly 101. For example, in this illustrative embodiment the first chamber 701 of the first device housing 102 is disposed between the linear recess 605 of the first device housing 102 and the hinge assembly 101. Similarly, the second chamber 702 of the second device housing 103 is disposed between the linear recess 606 of the second device housing 103 and the hinge assembly 101.

While shown as flat surfaces spanning the width of the first chamber 701 and the second chamber 702, respectively, in FIG. 7, it should be noted that the inclined planes 703,704 could be augmented with, or replaced by, other inclined plane structures. As noted above, these inclined planes 703,704 could be integrated into hinge housing components that simply situate within the first chamber 701 and the second chamber 702 when the electronic device 100 is assembled.

Illustrating by example, turning now to FIGS. 8A and 8B, in this illustrative embodiment each of the first support plate 601 and the second support plate 602 is bounded by inclined apertures. FIG. 8A shows the support plates 601,602 in the electronic device, while FIG. 8B illustrates the inclined apertures 801,802 of inclined plane 703 (inclined plane 704) includes similar inclined apertures in this illustrative embodiment). As shown, the inclined apertures 801,802 are defined by a first support plate engaging ramp and a second support plate engaging ramp and within which posts extending distally from the edges of the first support plate 601 and second support plate 602 insert. This configuration latches and retains the posts within the inclined apertures 801,802, thereby defining an enclosed track within which the posts may travel as the electronic device 100 pivots between the axially displaced open position (400) and the closed position (200).

In the illustrative embodiment of FIGS. 8A and 8B, the inclined apertures 801,802 are included in addition to the inclined planes 703,704. However, in other embodiments the inclined apertures 801,802 will be omitted. In still other embodiments, the inclined apertures 801,802 will replace the inclined planes 703,704. The operation of the inclined apertures 801,802 will be more clearly illustrated below in FIGS. 14-15.

Turning now to FIG. 9, illustrated therein is a partial cut away view of the electronic device 100 showing the mechanical mechanism facilitating support of the flexible display 121 during bending operations. In this illustration, the flexible display 121 is positioned within the first chamber 701 and second chamber 702 of the first device housing 102 and the second device housing 103, respectively. As shown, the first device housing 102 defines the first chamber 701, while the second device housing 103 defines the second chamber 702.

In this illustrative embodiment, inclined plane 703 is defined by a first support plate engaging ramp that is coupled to the first device housing 102. Similarly, inclined plane 704 is defined by a second support plate engaging ramp, which is coupled to the second device housing 103. In one or more embodiments, each of the first support plate engaging ramp and the second support plate engaging ramp is a component of the hinge assembly 101 and is fixedly coupled to the first device housing 102 and the second device housing 103, respectively.

As shown in FIG. 9, the first device housing 102 and the second device housing 103 have been pivoted about the hinge housing 201 to the closed position 200. In one or more embodiments, when this occurs, a distal end 901,902 of each of the first support plate 601 and the second support plate 602 travels along its respective inclined plane 703,704 between a first position (shown in FIG. 10) within the first device housing 102 and the second device housing 103, respectively, to a second position (shown in FIG. 9) within the first device housing 102 and the second device housing 103, respectively.

The distal ends 901,902 of each of the first support plate 601 and the second support plate 602 therefore travel, in one or more embodiments, along their respective inclined planes 703,704 through the first chamber 701 and the second chamber 702 between the first position of FIG. 10 within the first device housing 102 and the second device housing 103, respectively, to the second position of FIG. 9 within the first device housing 102 and the second device housing 103, respectively, when the first device housing 102 and the second device housing 103 pivot about the hinge housing 201 from an axially displaced open position (400) to the closed position 200 of FIG. 9. When this occurs, the first support plate 601, the hinge housing 201, and the second support plate 602 define boundaries within which the flexible display 121 defines a service loop 903.

The area opened for the service loop 903 by the translation of the first support plate 601 and the second support plate 602, in one embodiment, provides a radius that is sufficient to prevent the flexible display 121 from kinking or folding. The opened area also works to minimize mechanical memory problems when the first device housing 102 and the second device housing 103 pivot about the hinge housing 201 to the open position (400).

As described above, the first support plate 601 is pivotally coupled to a first side 603 of the hinge housing 201. The first support plate 601 extends distally into the first chamber 701 from the first side 603 of the hinge housing 201. Similarly, the second support plate 602 is pivotally coupled to a second side 604 of the hinge housing 201. The second support plate 602 extends distally into the second chamber 702 from the second side 604 of the hinge housing 201. The distal end 901 of the first support plate 601 and the distal end 902 of the second support plate 602 each travel along its respective inclined plane 703,704 between a first position within the first chamber 701 and the second chamber 702, respectively, as shown in FIG. 10, to a second position within the first chamber 701 and the second chamber 702, respectively, as shown in FIG. 9, when the first device housing 102 and the second device housing 103 pivot about the hinge housing 201 from the axially displaced open position (400) to the closed position 200.

The translation of the first support plate 601 and the second support plate 602 along the inclined planes 703,704 from a shallow position (FIG. 10) within the first device housing 102 and the second device housing 103, to the deep position within the first device housing 102 and the second device housing 103 shown in FIG. 9, when the first device housing 102 pivots about the hinge housing 201 relative to the second device housing 103 from the axially displaced open position (400) to the closed position 200, results in the first support plate 601 and the second support plate 602 abutting the outer major face of the flexible display 121 when the first device housing 102 and the second device housing 103 are in the closed position 200.

Turning now to FIG. 10, the first device housing 102 and the second device housing 103 have been rotated about the hinge housing 201 to the axially displaced open position 400. When this occurs, due to the action of the hinge housing 201, the distal ends 901,902 of the first support plate 601 and the second support plate 602 translate up their respective inclined planes 703,704, through the first chamber 701 and the second chamber 702, from the second position of FIG. 9 to the first position shown in FIG. 10. In the illustrative embodiment of FIG. 10, when the distal ends 901,902 of the first support plate 601 and the second support plate 602 fully translate up their respective inclined planes 703,704 from the second position of FIG. 9 to the first position shown in FIG. 10, they sit atop ends of the inclined planes 703,704.

In this position, and as shown in FIG. 10, when the distal ends 901,902 of the first support plate 601 and the second support plate 602 fully translate up their respective inclined planes 703,704 from the second position of FIG. 9 to the first position shown in FIG. 10, the first support plate 601, the hinge housing 201, and the second support plate 602 bridge the linear recess (605) of the first device housing 102 and the linear recess (606) of the second device housing 103 when the first device housing 102 and the second device housing 103 are in an axially displaced open position 400 shown in FIG. 10. Since the distal ends 901,902 of the first support plate 601 and the second support plate 602 have translated up their respective inclined planes 703,704 from the second position of FIG. 9 to the first position shown in FIG. 10, the first support plate 601, the second support plate 602, and the hinge housing 201 work in tandem to mechanically support the flexible display 121.

By comparing FIGS. 9 and 10, it can be seen that when the flexible display 121 is fixedly coupled to the first device housing 102 and also fixedly coupled to the second device housing 103, with the first device housing 102, hinge housing 201, and second device housing 103 configured to cause the flexible display 121 to extend and become substantially planar when the first device housing 102 and second device housing 103 are in the axially displaced open position 400, the path length 1002 of the mechanical mechanism defined by the first support plate 601, the second support plate 602, and the hinge housing 201 can be different than the path length 1001 of the section of the flexible display 121 that bends when each is in the closed position 200. Said differently, where the flexible display 121 is configured to extend flat when in the axially displaced open position 400, when the folding mechanism is in the closed position 200 the length 1001 of the service loop 903 defined by the flexible display 121 and the mechanical boundaries defined by the first support plate 601, hinge housing 201, and second support plate 602 may be different.

In particular, to provide sufficient room for the service loop 903, the mechanical mechanism defined by the first support plate 601, the hinge housing 201, and the second support plate 602 may be longer than the length 1001 of the flexible display 121 that bends to define the service loop 903 by a predefined amount. This difference 1003 in length can be problematic in that it can result in either deformations in the service loop 903 when the mechanism is in the closed position 200, or alternatively it can result in mechanical strain or unevenness in the flexible display 121 when the mechanism is in the axially displaced open position 400.

While a spring-loaded plate can be used to apply tension to one end of the flexible display to compensate for the distance difference 1003 as noted above, embodiments of the disclosure provide an improved hinge mechanism that allows for the flexible display 121 to be fixedly connected to the first device housing 102 and second device housing 103, respectively, as well as to fully extend when the mechanism is in the axially displaced open position 400. At the same time, the hinge mechanism allows the flexible display 121 form a proper service loop 903 when the mechanism is in the closed position 200.

Embodiments of the disclosure accomplish this by employing a hinge mechanism that changes a displacement (610) between the hinge housing 201 and the first device housing 102 and second device housing 103, respectively, as the first device housing 102 and second device housing 103 pivot about the hinge housing 201 between the axially displaced open position 400 and the closed position 200. Effectively, hinges configured in accordance with embodiments of the disclosure cause the hinge housing 201 to get closer to the first device housing 102 and second device housing 103, respectively, when the electronic device is in the axially displaced open position 400, and farther from the hinge housing 201 when the electronic device is in the closed position 200. This changing distance compensates for the difference between the bending length 1001 of the flexible display 121 and the length 1002 of the mechanical mechanism supporting the flexible display 121.

Turning now to FIGS. 11-12, illustrated therein is a general mechanical schematic illustrating one explanatory way this can be accomplished. Shown in FIGS. 11-12 is a hinge mechanism 1100 configured to change a displacement 1101,1201 between the hinge housing 201 and the first device housing 102 and second device housing 103, respectively, when the first device housing 102 and the second device housing 103 pivot about the hinge housing 201 between the axially displaced open position 400 and the closed position 200.

In one or more embodiments, the hinge housing 201 comprises a hinge assembly 101 that couples a first device housing 102 of an electronic device to a second device housing 103 such that the first device housing 102 is pivotable about the hinge housing 201 relative to the second device housing 103 between a closed position 200 and an axially displaced open position 400. In one or more embodiments, the hinge assembly 101 changes a displacement 1101,1201 between the first device housing 102 and the second device housing 103, respectively, when the first device housing 102 and the second device housing 103 pivot about the hinge housing 201 between the axially displaced open position 400 and the closed position 200. This allows an interior surface 609 of the hinge housing 201 to be positioned farther from the first device housing 102 and the second device housing 103, respectively, when the first device housing 102 is pivoted about the hinge housing 201 relative to the second device housing 103 to the closed position 200 than when the first device housing 102 is pivoted about the hinge housing 201 relative to the second device housing 103 to the axially displaced open position 400.

In one or more embodiments, the hinge housing 201 is coupled to a first hinge arm 1102. The first hinge arm 1102 extends into the first device housing 102 and comprises a first pin 1106 extending from a terminal edge of the first hinge arm 1102. In one or more embodiments, the first pin 1106 engages a first slot 1108 defined by a first bracket 1104. In one or more embodiments, the first bracket 1104 is fixedly coupled to the first device housing 102.

In one or more embodiments, the hinge housing 201 is also coupled to a second hinge arm 1103. The second hinge arm 1103 extends into the second device housing 103 and comprises a second pin 1107 engaging a second slot 1109 defined by a second bracket 1105. In one or more embodiments, the second bracket 1105 is fixedly coupled to the second device housing 103.

In one or more embodiments, each of the first hinge arm 1102 and the second hinge arm 1103 is translationally coupled to the first bracket 1104 and the second bracket 1105 in that the first pin 1106 and the second pin 1107 can translate within the first slot 1108 and the second slot 1109, respectively, when the first device housing 102 and the second device housing 103 pivot about the hinge housing 201 between the axially displaced open position 400 and the closed position 200. As will be shown in more detail below with reference to FIGS. 16-18, in one or more embodiments linking arms couple the first bracket 1104 and the second bracket 1105 to the hinge housing 201, which results in this translation. Meanwhile, the first hinge arm 1102 and the second hinge arm 1103, as well as the linking arms which are not shown in FIGS. 11-12 so that the other components can be more readily seen, are each pivotally coupled to the hinge housing 201 such that the first device housing 102 can pivot about the hinge housing 201 relative to the second device housing 103 between the closed position 200 of FIG. 11 and the axially displaced open position 400 of FIG. 12.

To facilitate a change in displacement between the first device housing 102 and the hinge housing 201, and additionally between the second device housing 103 and the hinge housing 201, in one or more embodiments a sliding mechanism is established between the first hinge arm 1102 and the first bracket 1104 and the second hinge arm 1103 and the second bracket 1105. Meanwhile, a pivoting mechanism is established between the hinge housing 201 and each of the first hinge arm 1102 and the second hinge arm 1103. The inclusion of this combined sliding mechanism and pivoting mechanism allows each of the first hinge arm 1102 and the second hinge arm 1103 to translate relative to the first bracket 1104 and the second bracket 1105, respectively, as the first hinge arm 1102 and second hinge arm 1103, and accordingly the first device housing 102 and the second device housing 103, pivot relative to the hinge housing 201 between the closed position 200 of FIG. 11 and the axially displaced open position 400 of FIG. 12.

Illustrating by example, in FIG. 11, the terminal edge 1110 of the first hinge arm 1102 and the terminal edge 1111 of the second hinge arm 1103 are positioned such that the first pin 1106 and the second pin 1107 situate at an end of a translation region of the first slot 1108 and the second slot 1109, respectively, that is closer to the hinge housing 201 in FIG. 11. By contrast, the terminal edge 1110 of the first hinge arm 1102 and the terminal edge 1111 of the second hinge arm 1103 are positioned such that the first pin 1106 and the second pin 1107 situate at another end of a translation region of the first slot 1108 and the second slot 1109, respectively, that is farther from the hinge housing 201 in FIG. 12.

As will be explained in more detail with reference to FIGS. 16-18 below, in one or more embodiments linking arms coupled between the hinge housing 201 and the first bracket 1104 and the second bracket 1105 apply a force when the first device housing 102 and the second device housing 103 pivot about the hinge housing 201 to cause these sliding mechanisms to move such that the first pin 1106 and the second pin 1107 translate within the translation regions of the first slot 1108 and the second slot 1109 when the first hinge arm 1102 and second hinge arm 1103, and accordingly the first device housing 102 and the second device housing 103, pivot relative to the hinge housing 201 between the closed position 200 of FIG. 11 and the axially displaced open position 400 of FIG. 12. Advantageously, the inclusion of these sliding mechanisms as coupling links between the hinge housing 201 and the first device housing 102 and the second device housing 103, respectively, allows the first pin 1106 and the second pin 1107 to translate within the translation portions of the first slot 1108 and the second slot 1109 as the first hinge arm 1102 and the second hinge arm 1103 pivot between the closed position 200 of FIG. 11 and the axially displaced open position 400 of FIG. 12.

While FIGS. 11 and 12 illustrate general embodiments demonstrating how the hinge assembly 101 facilitate this translation to change the displacement 1101,1201 between the hinge housing 201 and the first device housing 102 and the second device housing 103 when the first hinge arm 1102 and the second hinge arm 1103 pivot between the axially displaced open position 400 and the closed position 200, specific mechanisms illustrating how this translation occurs will be shown in subsequent figures. FIGS. 11 and 12 are provided to generally illustrate the concept of translation of the first hinge arm 1102 and the second hinge arm 1103, with later figures illustrating examples of more specific embodiments.

Figure 13:
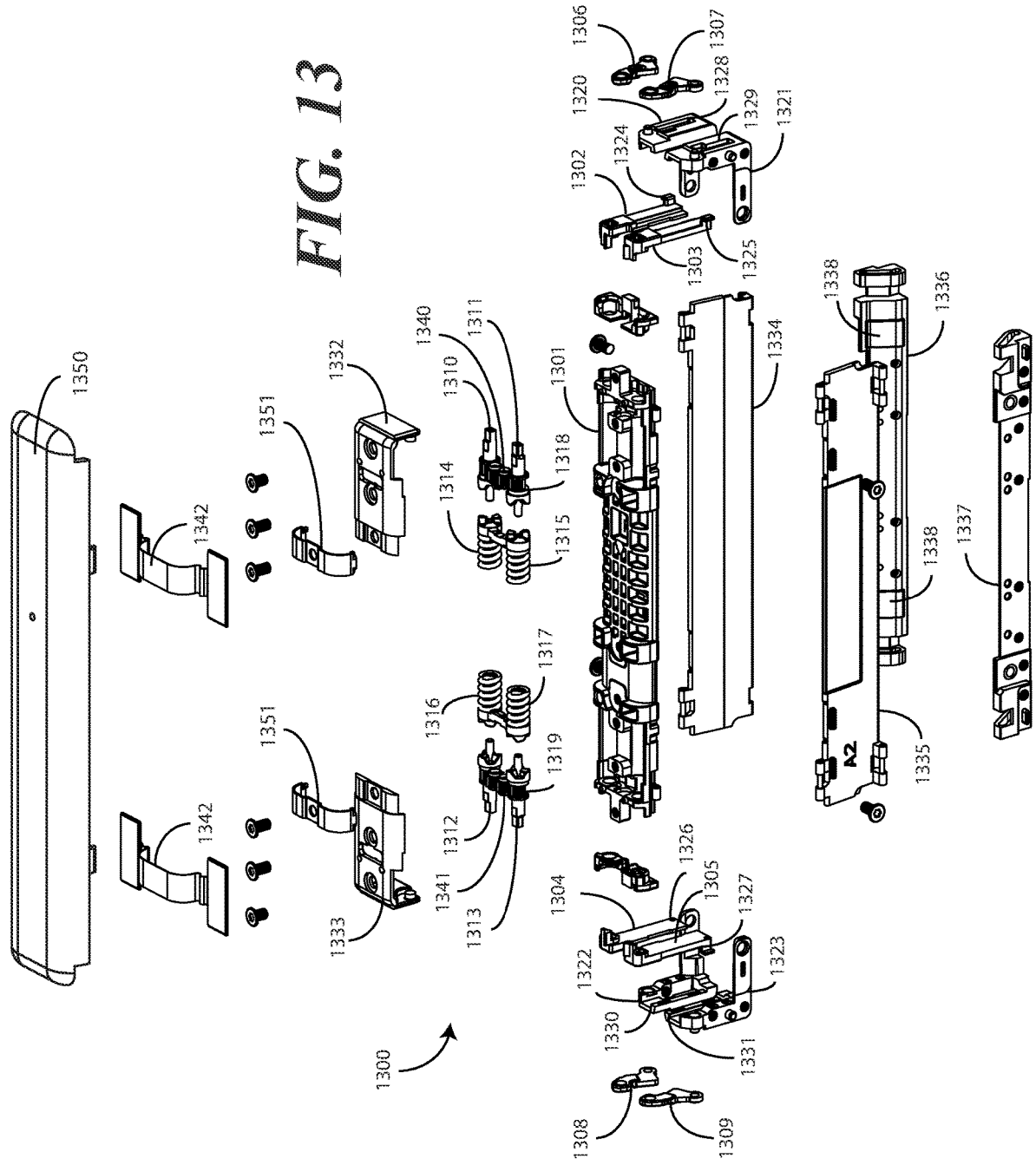
FIG. 13 illustrates an exploded view of one explanatory hinge assembly configured in accordance with one or more embodiments of the disclosure.

Accordingly, with this general concept understood from a basic embodiment, attention will now be turned to one explanatory implementation of the concept of FIGS. 11-12 to demonstrate one illustrative example of how the concept can be implemented in an electronic device. Turning now to FIG. 13, illustrated therein is one explanatory hinge assembly 1300 configured in accordance with one or more embodiments of the disclosure.

As shown in FIG. 13, the hinge assembly 1300 comprises a hinge housing 1301 that serves as a housing for a hinge mechanism. In the illustrative embodiment of FIG. 13, the hinge mechanism comprises hinge arms 1302,1303,1304, 1305, linking arms 1306,1307,1308,1309, rotating posts 1310,1311,1312,1313, tensioning springs 1314,1315,1316, 1317, interlocking gears 1318,1319, and brackets 1320, 1321,1322,1323. These components defining the hinge mechanism are coupled to the hinge housing 1301. When implemented in an electronic device (100) having a first device housing (102) and a second device housing (103), hinge arms 1302,1304 are coupled to the hinge housing 1301 and extend into the first device housing (102). Similarly, hinge arms 1303,1305 are coupled to the hinge housing 1301 and extend into the second device housing (103).

In one or more embodiments, each hinge arm 1302,1303, 1304,1305 comprises a pin 1324,1325,1326,1327 extending distally from its respective hinge arm 1302,1303,1304,1305. In the illustrative embodiment of FIG. 13, each pin 1324, 1325,1326,1327 extends distally from a terminal edge of its respective hinge arm 1302,1303,1304,1305. However, in other embodiments the pins 1324,1325,1326,1327 extend distally from another portion of the hinge arm 1302,1303, 1304,1305, examples of which include a midpoint of the hinge arm 1302,1303,1304,1305, a three-quarter point of the hinge arm 1302,1303,1304,1305, an eighty-percent point of the hinge arm 1302,1303,1304,1305, or a ninety-percent point of the hinge arm 1302,1303,1304,1305. These measurements, e.g., three-quarter, eighty percent, and ninety percent, indicate the portion of the length of the hinge arm from the point coupled to the hinge housing 1301. Other locations suitable for the locations from which the pins 1324,1325,1326,1327 extend from the hinge arms 1302, 1303,1304,1305 will be obvious to those of ordinary skill in the art having the benefit of this disclosure.

In one or more embodiments, each pin 1324,1325,1326, 1327 engages a slot 1328,1329,1330,1331 defined by each bracket 1320,1321,1322,1323. Illustrating by example, in the explanatory embodiment of FIG. 13, a first hinge arm 1302 is coupled to the hinge housing 1301 and extends into the first device housing (102) with a first pin 1324 extending distally from a terminal edge of the first hinge arm 1302 that engages a slot 1328 defined by a first bracket 1320. In one or more embodiments, the first bracket 1320 is fixedly coupled to the first device housing (102). Similarly, a second hinge arm 1303 is coupled to the hinge housing 1301 and extends into the second device housing (103), with the second hinge arm 1303 comprising a second pin 1325 extending from a terminal edge of the second hinge arm 1303 that engages a slot 1329 defined by a second bracket 1321. In one or more embodiments, the second bracket 1321 is fixedly coupled to the second device housing (103).

As with the general embodiment of FIGS. 11-12, in FIG. 13 the hinge mechanism is configured to change a displacement between the hinge housing 1301 and the first device housing (102) and second device housing (103), respectively, when the first device housing (102) and the second device housing (103) pivot about the hinge housing 1301 between the axially displaced open position (400) and the closed position (200). In one or more embodiments, the displacement is shorter when the first device housing (102) and the second device housing (103) are pivoted about the hinge housing 1301 to the axially displaced open position (400) than when the first device housing (102) and second device housing (103) are pivoted about the hinge housing 1301 to the closed position (200).

To accomplish this, in one or more embodiments the pins 1324,1325,1326,1327 each translate within their respective slots 1328,1329,1330,1331 when the first device housing (102) and the second device housing (103) pivot about the hinge housing 1301 between the axially displaced open position (400) and the closed position (200). In one or more embodiments, this translation of these pins 1324,1325,1326, 1327 within their respective slots 1328,1329,1330,1331 changes a displacement between the hinge housing 1301 and the first device housing (102) and second device housing (103).

For example, looking at the right side of the hinge assembly 1300, in one or more embodiments a first pin 1324 would translate within a first slot 1328 of the first bracket 1320, while a second pin 1325 would translate within a second slot 1329 of the second bracket 1321 when the first device housing (102) and second device housing (103) rotate about the hinge housing 1301 between the closed position (200) and the axially displaced open position (400). This translation changes the displacement between the first device housing (102) and the hinge housing 1301 and the second device housing (103) and the hinge housing 1301. In one or more embodiments, the displacement is shorter when the first device housing (102) and the second device housing (103) are pivoted about the hinge housing 1301 to the axially displaced open position (400) than when the first device housing (102) and the second device housing (103) are pivoted about the hinge housing 1301 to the closed position (200).

This translation is mechanically the caused by the coupling of the linking arms 1306,1307,1308,1309 between the hinge housing 1301 and each bracket 1320,1321,1322,1323. Illustrating by example, again looking at the right side of the hinge assembly 1300, a first linking arm 1306 is coupled between the hinge housing 1301 and the first bracket 1320. Similarly, a second linking arm 1307 is coupled between the hinge housing 1301 and the second bracket 1321.

In one or more embodiments, the linking arms 1306,1307, 1308,1309 and the hinge arms 1302,1303,1304,1305 are coupled to the hinge housing 1301 at different pivot centers. For example, a first hinge arm 1302 would pivot about a first pivot center at the hinge housing 1301 while the first hinge arm 1302 pivots about the hinge housing 1301 at a second pivot center. The second linking arm 1307 would pivot about the hinge housing 1301 at a third pivot center, while the fourth hinge arm 1305 pivots about a fourth pivot center at the hinge housing 1301, and so forth. These pivot centers will be shown and described in more detail with reference to FIGS. 16-18 below.

Figure 16:
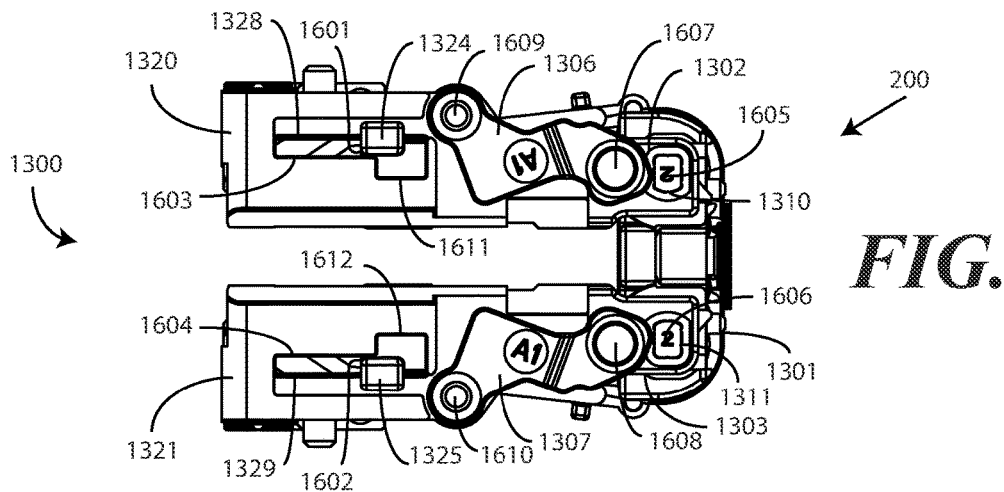
FIG. 16 illustrates a side elevation view of one explanatory hinge assembly configured in accordance with one or more embodiments of the disclosure in the closed position.
Figure 17:
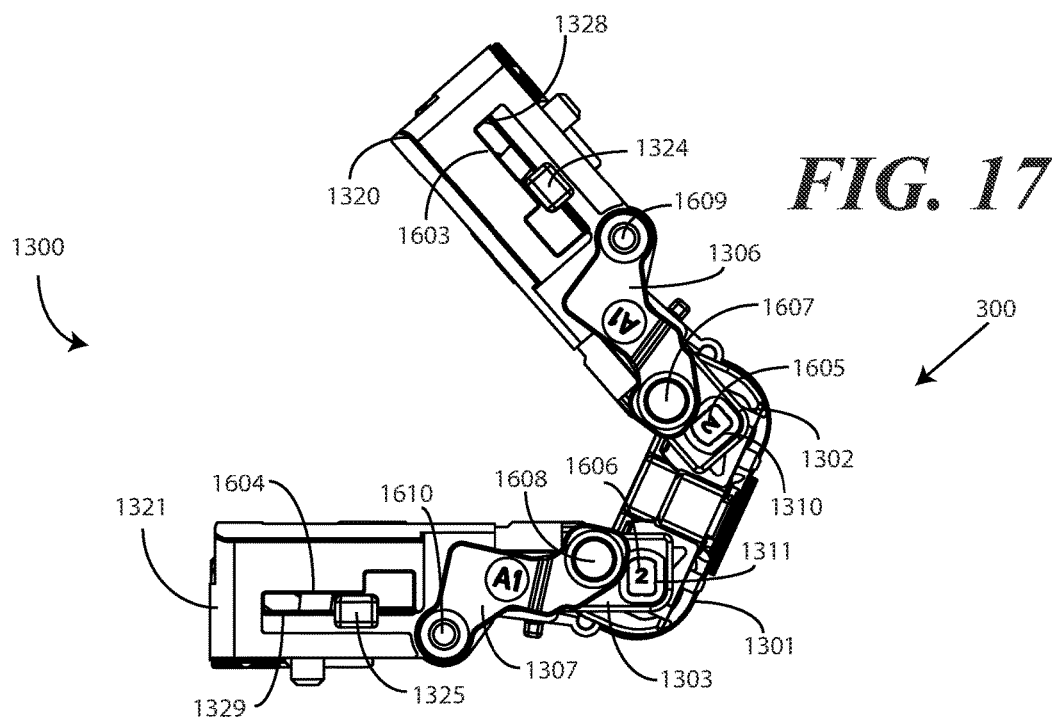
FIG. 17 illustrates a side elevation view of one explanatory hinge assembly configured in accordance with one or more embodiments of the disclosure in the partially open position.
Figure 18:
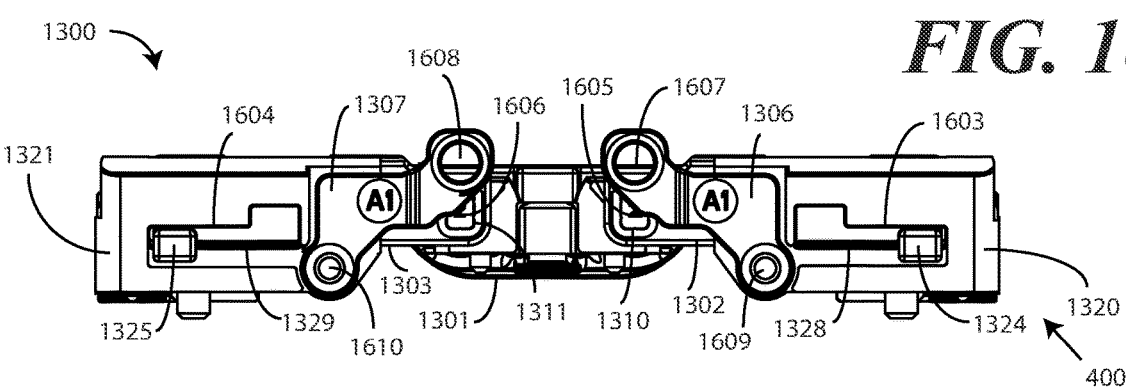
FIG. 18 illustrates a side elevation view of one explanatory hinge assembly configured in accordance with one or more embodiments of the disclosure in the axially displaced open position.

While FIGS. 16-18 illustrate how the different pivot centers function to alter the displacement between the hinge housing 1301 and the first device housing (102) and the second device housing (103), FIG. 13 illustrates examples of each pivot center as well. In one or more embodiments, each hinge arm 1302,1303,1304,1305 couples to a rotating post 1310,1311,1312,1313. For example, the first hinge arm 1302 would couple to a first rotating post 1310, while a second hinge arm 1303 would couple to a second rotating post 1311, and so forth.

In one or more embodiments, each rotating post 1310, 1311,1312,1313 defines a cross section that is asymmetrical along at least one medial axis that engages a correspondingly asymmetrical aperture defined by its corresponding hinge arm 1302,1303,1304,1305 Illustrating by example, in the illustrative embodiment of FIG. 13 each rotating post 1310,1311,1312,1313 comprises an arched post having one have that is shaped like half a rectangle while the other half has side edges bridged by an arch. Said differently, in one or more embodiments each arched post defines a flat major surface on one side and an arched surface on the other side. As will be shown in more detail in FIGS. 16-18 below, in one or more embodiments a flat side of the arched post faces the pivot centers of the linking arms 1306,1307,1308,1309 when the hinge mechanism of the hinge assembly 1300 is in the closed position (200).

These arched posts work as keys within the arched apertures of the hinge arms 1302,1303,1304,1305 so that rotation of the hinge arms 1302,1303,1304,1305 also rotates the rotating posts 1310,1311,1312,1313. Accordingly, in one or more embodiments each hinge arm 1302,1303,1304,1305 defines an arched aperture positioned about an arched post situated at the end of the rotating posts 1310,1311,1312, 1313 having a central axis defining a pivot center for each of the hinge arms 1302,1303,1304,1305.

In one or more embodiments, the linking arms 1306,1307, 1308,1309 couple between a post extending distally from each bracket 1320,1321,1322,1323 and another post extending distally from an end cover 1332,1333 that couples to the hinge housing 1301 using one or more screws. The posts extending distally from each end cover 1332,1333 (two are shown in FIG. 13 but there are four in this illustrative embodiment) define pivot centers for the linking arms 1306,1307,1308,1309 that have central axes that are parallel with, but not colinear with, the pivot centers defined by the rotating posts 1310,1311,1312,1313. Thus, while the rotating posts 1310,1311,1312,1313 would define two pivot centers (one by an axis passing through rotating posts 1310,1312 about which hinge arms 1302,1304 rotate and another by an axis passing through rotating posts 1311,1313 about which hinge arms 1303,1305 rotate), the posts extending from the end covers 1332,1333 would define a third pivot center about which linking arms 1306,1308 rotate and a fourth pivot center about which linking arms 1307,1309 rotate. In one or more embodiments, axes passing through these four pivot centers are each parallel, but are not concentrically aligned with any other pivot center axis. This will be shown in more detail below in FIGS. 16-18.

In one or more embodiments, a first support plate 1334 is pivotally coupled to a first side of the hinge housing 1301. The first support plate 1334 extends distally into the first device housing (102) from the first side of the hinge housing 1301.

In one or more embodiments, a second support plate 1335 is pivotally coupled to a second side of the hinge housing

1301. The second support plate 1335 extends distally into the second device housing (103) from the second side of the hinge housing 1301.

In one or more embodiments, a first support plate engaging ramp 1336 is coupled between the first bracket 1320 and the third bracket 1322, while a second support plate engaging ramp 1337 is coupled between the third bracket 1322 and the fourth bracket 1323. In one or more embodiments, each of the first support plate engaging ramp 1336 and the second support plate engaging ramp 1337 defines an inclined plane 1338 along which a distal end of the first support plate 1334 and the second support plate 1335 can translate, respectively.

As was shown in FIG. 7 above, in one or more embodiments the first device housing (102) and the second device housing (103) define a first chamber (701) and a second chamber (702), respectively. In one or more embodiments, the hinge assembly 1300, after assembly, situates within this first chamber (701) and second chamber (702) such that the first support plate engaging ramp 1336 and the second support plate engaging ramp 1337 situate at ends of the first chamber (701) and second chamber (702) distally away from the hinge housing 1301. Where so situated, a distal end of each of the first support plate 1334 and the second support plate 1335 travels along the inclined plane 1338 (the inclined plane of the second support plate engaging ramp 1337 is facing into the page in FIG. 13) within the first chamber (701) of the first device housing (102) and the second chamber (702) of the second device housing (103), respectively, between first support plate position within the first device housing (102) and the second device housing (103) where the distal ends of the first support plate 1334 and the second support plate 1335 are at the bottom of the inclined planes 1338 and a second support plate position within the first device housing (102) and the second device housing (103) where the distal ends of the first support plate 1334 and the second support plate 1335 are at the top of the inclined planes 1338 as the first device housing (102) and the second device housing (103) pivot about the hinge housing 1301 between the closed position (200) and the axially displaced open position (400).

As best seen by looking at pin 1327, in one or more embodiments each pin 1324,1325,1326,1327 define an L-shaped cross section. This L-shaped cross section allows each pin 1324,1325,1326,1327 to be captively held within a translation section of its corresponding slot 1328,1329,1330, 1331. As will be illustrated in more detail below with reference to FIGS. 16-18, in one or more embodiments each slot 1328,1329,1330,1331 defines both an insertion section, through which the base of the L-shaped cross section can be inserted, and a translation section where only the upper portion of the L-shaped cross section may pass. When the pins 1324,1325,1326,1327 are within the translation sections of each slot 1328,1329,1330,1331, this allows the base of the L-shaped cross section to captively retain each pin 1324,1325,1326,1327 within the translation section of each slot 1328,1329,1330,1331. In one or more embodiments, to make movement easier and to avoid snagging, the upper section of each L-shaped cross section defines a chamfered rectangular cross section.

In one or more embodiments, this chamfered rectangular cross section situates within a rectangular perimeter of the translation section of each slot 1328,1329,1330,1331 such that the upper portion of the L-shaped cross section of each pin 1324,1325,1326,1327 can translate within the translation section of each slot 1328,1329,1330,1331 between at least a first location within each slot 1328,1329,1330,1331 and a second location within the translation section of each slot 1328,1329,1330,1331 as the hinge arms 1302,1303,1304, 1305 rotate relative to the hinge housing 1301. This ability to translate occurs due to the fact that the width of the translation section of each slot 1328,1329,1330,1331 is greater than that of the upper portion of the L-shaped cross sections of the pins 1324,1325,1326,1327. This translation, as well as the first location and second location, will be shown in more detail below with reference to FIGS. 16-18.

In one or more embodiments, the first location is more centrally located within the slots 1328,1329,1330,1331, i.e., is closer to the hinge housing 1301 and more toward the middle of the translation sections of the slots 1328,1329, 1330,1331, than the second location, which is more toward the end of each slot 1328,1329,1330,1331 and away from the hinge housing 1301. In one or more embodiments, upper portions of the L-shaped cross sections of the pins 1324, 1325,1326,1327 situate at the first location of the slots 1328,1329,1330,1331 when the first device housing (102) pivots about the hinge housing 1301 to the closed position (200). Similarly, upper portions of the L-shaped cross sections of the pins 1324,1325,1326,1327 situate at the second location of the slots 1328,1329,1330,1331 when the first device housing (102) pivots about the hinge housing 1301 to the axially displaced open position (400). This translating action changes the displacement (610) between the hinge housing 1301 and the first device housing (102) and second device housing (103).

As noted above, in one or more embodiments each rotating post 1310,1311,1312,1313 defines an arched post that is asymmetrical about at least one medial axis. In one or more embodiments, each hinge arm 1302,1303,1304,1305 then defines an arched aperture that situates around the arched post section of the rotating posts 1310,1311,1312, 1313 in a key-keyhole relationship.

In one or more embodiments, each rotating post 1310, 1311,1312,1313 is coupled to a cam having multiple detents in its face. When the hinge is assembled, the cam abuts a stator having protrusions that situate within the detents appearing in the face of the cam. In one or more embodiments, the stator is coupled to a tensioning spring 1314, 1315,1316,1317. When the hinge arms 1302,1303,1304, 1305 pivot the rotating posts 1310,1311,1312,1313 relative to the hinge housing 1301, this causes the cams coupled to the rotating posts 1310,1311,1312,1313 to rotate. This rotation, in turn, rotates the stators, causing the tensioning springs 1314,1314,1316,1317 to compress as the protrusions move into, and out of, the detents of the cam. This spring action allows the device housings coupled to the brackets 1320,1321,1322,1323 to situate at predefined angles, which can include the axially displaced open position (400) and closed position (200), when the protrusions fully situate within the detents.

In one or more embodiments, the interlocking gears 1318,1319 also situate against corresponding gears 1340, 1341 linking the interlocking gears 1318,1319 of each rotating post 1310,1311,1312,1311 such that the interlocking gears 1318,1319 and the corresponding gears 1340,1341 interlock. When one rotating post, e.g., rotating post 1310, rotates due to one device housing pivoting relative to the hinge housing 1301, the interlocking gears 1318,1319 cause another rotating post, e.g., rotating post 1311, to also rotate via the corresponding gears 1340,1341. This means that hinge arm 1302 and hinge arm 1303 always rotate axially about the hinge housing 1301 at the same angular rate. The same is true with hinge arm 1304 and hinge arm 1305. The result is a symmetrical rotation of the first device housing (102) and the second device housing (103) about the hinge housing 1301 at all times.

In one or more embodiments the interlocking gears 1318, 1319 comprise a first toothed wheel and a second toothed wheel that engage a first toothed wheel and second toothed wheel of the corresponding gears 1340,1341 when the first device housing (102) pivots about the hinge housing 1301 relative to the second device housing (103). The engagement of the first toothed wheel and the second toothed wheel of the interlocking gears 1318,1319 with the first toothed wheel and second toothed wheel of the corresponding gears 1340, 1341 causes a symmetric angular rotation of the first device housing (102) and the second device housing (103) when the first device housing (102) pivots about the hinge housing 1301 relative to the second device housing (103). Accordingly, in one or more embodiments when the interlocking gears 1318,1319 are operatively coupled to the hinge arms 1302,1303,1304,1305 and brackets 1320,1321,1322,1323 via the rotating posts 1310,1311,1312,1313 and the linking arms 1306,1307,1308,1309, the interlocking gears 1318.1319 cause a symmetric angular rotation of the hinge arms 1302,1303,1304,1305 and brackets 1320,1321,1322, 1323 when the first device housing (102) pivots about the hinge housing 1301 relative to the second device housing (103).

When the hinge arms 1302,1303,1304,1305 and brackets 1320,1321,1322,1323 rotate relative to the hinge housing 1301 between the closed position (200) and the axially displaced open position (400), the linking arms 1306,1307, 1308,1309 act as both checkrein and pushrod upon the brackets 1320,1321,1322,1323 relative to the hinge housing 1301, thereby causing the pins 1324,1325,1326,1327 of the hinge arms 1302,1303,1304,1305 to slide closer to the hinge housing 1301 within the slots 1328,1329,1330,1331 when the hinge assembly 1300 is in the closed position (200), and distally farther away from the hinge housing 1301 within the slots 1328,1329,1330,1331 when the hinge assembly 1300 is in the axially displaced open position (400). Said differently, by acting as both checkrein and pushrod, the linking arms 1306,1307,1308,1309 cause the pins 1324,1325,1326,1327 of the hinge arms 1302,1303,1304,1305 situated within the slots 1328,1329,1330,1331 of the brackets 1320,1321,1322, 1323 to translate between the first location of the translation sections of the slots 1328,1329,1330,1331 and the second location of the translation sections of the slots 1328,1329, 1330,1331. More particularly, the linking arms 1306,1307, 1308,1309 cause the upper portions of the L-shaped cross sections of the pins 1324,1325,1326,1327 of the hinge arms 1302,1303,1304,1305 situated within the translation sections of the slots 1328,1329,1330,1331 to situate at the first location when the first device housing (102) coupled to brackets 1320,1322 is pivoted about the hinge housing 1301 to the axially displaced open position (400) relative to the second device housing (103) coupled to brackets 1321,1323, and to situate at the second location when the first device housing (102) coupled to brackets 1320,1322 is pivoted about the hinge housing 1301 to the axially displaced closed position relative to the second device housing (103) coupled to brackets 1321,1323. Again, this action will be illustrated in detail below with reference to FIGS. 16-18.

Embodiments of the disclosure contemplate that mechanical tolerances required for manufacturability may cause adjacent parts to abut less than perfectly. With moving parts such as the first support plate 1334 and the second support plate 1335, which pivot relative to the hinge housing 1301, this can create a rattling noise. Accordingly, in some embodiments, at least one length of elastic tape 1342 can be coupled to the first support plate 1334 and the second support plate 1335. The at least one length of elastic tape 1342 can then pass around, or through, the hinge housing 1301 to prevent any rattling sounds as the first support plate 1334 and the second support plate 1335 pivot about the hinge housing 1301.

In one or more embodiments, the at least one length of elastic tape 1342 pills the first support plate 1334 and the second support plate 1335 toward the hinge housing 1301, which places the first support plate 1334 and the second support plate 1335 under tension. In so doing, the at least one length of elastic tape 1342 eliminates rattling sounds without compromising degrees of freedom experienced by the first support plate 1334 and the second support plate 1335. If a user were to shake the electronic device (100), the at least one length of elastic tape 1342 precludes the electronic device (100) from rattling due to the first support plate 1334 and the second support plate 1335 banging against the hinge housing 1301. While the at least one length of elastic tape 1342 is shown as one length coupling to the first support plate 1334 and the second support plate 1335 and passing around the hinge housing 1301, this could be split into two with a first length of elastic tape coupling the first support plate 1334 to the hinge housing 1301 and another length of elastic tape coupling the second support plate 1335 to the hinge housing 1301. Moreover, as shown below with reference to FIGS. 25-26, lengths of elastic tape can be placed in multiple locations along the hinge housing 1301 as well. In one or more embodiments, each length of elastic tape adhesively couples to the first support plate 1334 and the second support plate 1335, although other attachment techniques will be obvious to those of ordinary skill in the art having the benefit of this disclosure. In one or more embodiments, the at least one length of elastic tape 1342 is under less tension when the hinge assembly 1300 is in the axially displaced open position (400) than when the hinge assembly 1300 is in the closed position (200).

In one or more embodiments, a decorative cover 1350 can be attached to the hinge housing 1301 to cover the various components of the hinge assembly 1300. In one or more embodiments, one or more snaps 1351 can be used to couple the decorative cover 1300 to the end covers 1332,1333 and/or hinge housing 1301. Other techniques for coupling components of the hinge assembly 1300 together will be obvious to those of ordinary skill in the art having the benefit of this disclosure.

Figure 14:
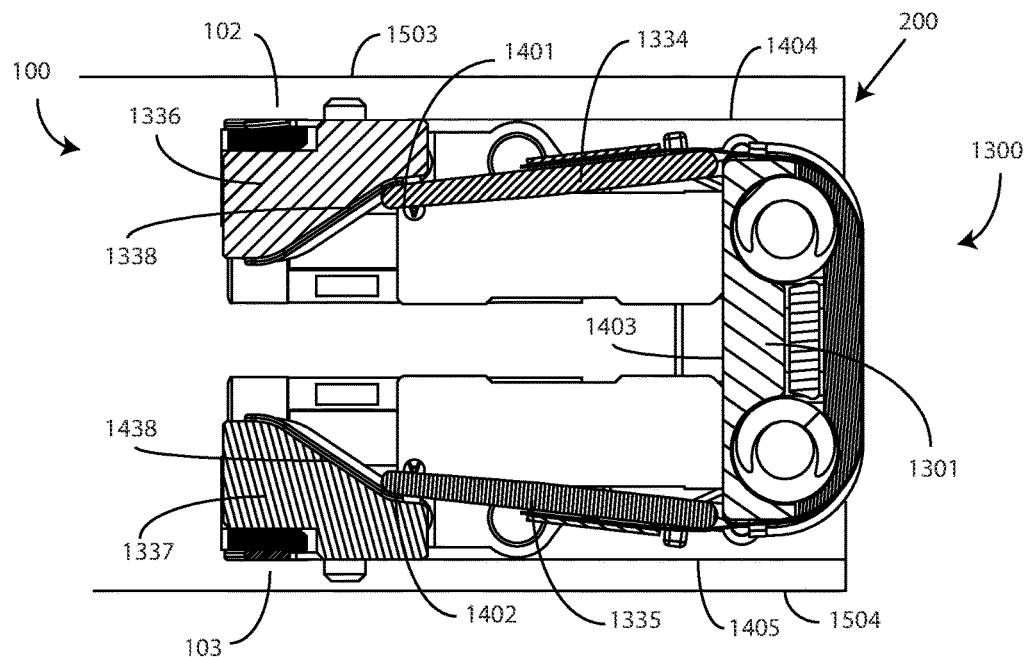
FIG. 14 illustrates a sectional view of one explanatory hinge assembly configured in accordance with one or more embodiments of the disclosure in the closed position.
Figure 15:
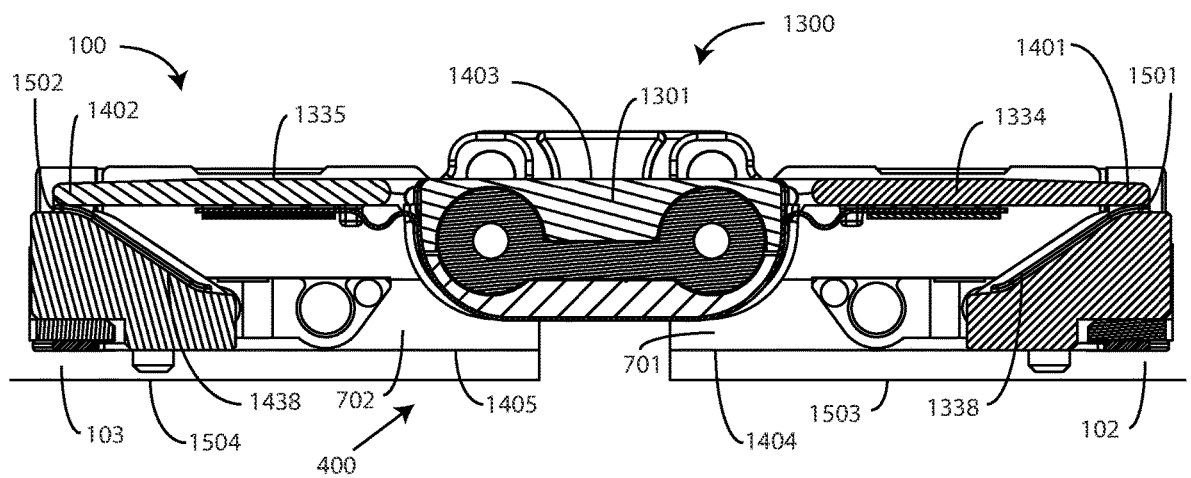
FIG. 15 illustrates a sectional view of one explanatory hinge assembly configured in accordance with one or more embodiments of the disclosure in the axially displaced open position.

Turning now to FIGS. 14-15, illustrated therein is a cut away view of the electronic device 100 of FIGS. 1-8, which utilizes the hinge assembly 1300 of FIG. 13 in this illustrative embodiment. In this illustration, the flexible display (121) is removed so that the operation of the components of the hinge assembly 1300 can be more readily seen. However, the action of the flexible display (121) in FIGS. 14-15 would be the same as that previously described above with reference to FIGS. 9-10 when the flexible display (121) is positioned within the linear recesses (605,606) of the first device housing 102 and the second device housing 103, respectively, with a first end of the flexible display (121) fixedly coupled to the first device housing 102 and a second end of the flexible display (121) fixedly coupled to the second device housing 103.

As shown in FIG. 14, the first device housing 102 and the second device housing 103 have been pivoted about the hinge housing 1301 to the closed position 200. In one or more embodiments, when this occurs, a distal end 1401, 1402 of each of the first support plate 1334 and the second support plate 1335 travels along its respective inclined plane 1338,1438 of the first support plate engaging ramp 1336 and the second support plate engaging ramp 1337 between a first position (shown in FIG. 15) within the first device housing 102 and the second device housing 103, respectively, to a second position (shown in FIG. 14) within the first device housing 102 and the second device housing 103, respectively.

The distal ends 1401,1402 of each of the first support plate 1334 and the second support plate 1335 therefore travel, in one or more embodiments, along their respective inclined planes 1338,1438 between the first position of FIG. 15 within the first device housing 102 and the second device housing 103, respectively, to the second position of FIG. 14 within the first device housing 102 and the second device housing 103, respectively, when the first device housing 102 and the second device housing 103 pivot about the hinge housing 1301 from an axially displaced open position 400 to the closed position 200 of FIG. 14.

When this occurs, the first support plate 1334, an interior surface 1403 of the hinge housing 1301, and the second support plate 1335 define boundaries within which the flexible display (121) defines a service loop (903). The area opened for the service loop (903) by the translation of the first support plate 1334 and the second support plate 1335, in one embodiment, has a radius that prevents the flexible display (121) from kinking or folding. It also works to minimize mechanical memory problems when the first device housing 102 and the second device housing 103 pivot about the hinge housing 1301 to the open position 400.

Turning now to FIG. 15, the first device housing 102 and the second device housing 103 have been rotated about the hinge housing 1301 to the axially displaced open position 400. When this occurs, due to the action of the hinge of the hinge housing 1301 (described above with reference to FIG. 13), the distal ends 1401,1402 of the first support plate 1334 and the second support plate 1335 translate up their respective inclined planes 1338,1438 from the second position of FIG. 14 to the first position shown in FIG. 15. In the illustrative embodiment of FIG. 15, when the distal ends 1401,1402 of the first support plate 1334 and the second support plate 1335 fully translate up their respective inclined planes 1338,1438 from the second position of FIG. 14 to the first position shown in FIG. 15, they sit atop ends 1501,1502 of the inclined planes 1338,1438.

In this position, and as shown in FIG. 15, when the distal ends 1401,1402 of the first support plate 1334 and the second support plate 1335 fully translate up their respective inclined planes 1338,1438 from the second position of FIG. 14 to the first position shown in FIG. 15, the first support plate 1334, the interior surface 1403 of the hinge housing 1301, and the second support plate 1335 bridge the linear recess defined by the of the first device housing 102 and the linear recess (606) of the second device housing 103 when the first device housing 102 and the second device housing 103 are in an axially displaced open position 400 shown in FIG. 15.

By comparing FIG. 14 and FIG. 15, a number of characteristics of embodiments of the disclosure can be seen. For example, in this illustrative embodiment the support plates 1334,1335 situate closer to the flexible display (121) when in the first position of FIG. 15, and can therefore provide mechanical support for the flexible display (121) by bridging the linear recess (605) of the first device housing 102 and the linear recess (606) of the second device housing 103 when the first device housing 102 and the second device housing 103 are in an axially displaced open position 400 shown in FIG. 15. By contrast, as shown in FIG. 14, the support plates 1334,1335 are farther from the flexible display (121) when in the second position. This occurs due to the fact that the distal ends 1401,1402 of the each of the first support plate 1334 and the second support plate 1335 travel along their corresponding inclined plane 1338,1438 from the first position to the second position when the first device housing 102 and the second device housing 103 pivot about the hinge housing 1301 from the axially displaced open position 400 to the closed position 200 to allow the flexible display to define a service loop (903).

In one or more embodiments, the support plates 1334, 1335 are farther from exterior surfaces 1503,1504 of the first device housing 102 and the second device housing 103 when in the first position of FIG. 15, but are closer to those exterior surfaces 1503,1504 of the first device housing 102 and the second device housing 103 when in the second position of FIG. 14. This results in the second position of FIG. 14 being deeper, relative to the interior surfaces 1404,1405 of the first device housing 102 and the second device housing 103, respectively, than the first position of FIG. 15.

Where included, the linear recesses (605,606) shown above in FIG. 6 define a support plane for the flexible display (121) on sides of the first device housing 102 and the second device housing 103 exterior of the chambers 701,702 defining the support plate receiving recesses of the first device housing 102 and the second device housing 103, respectively. However, the first support plate 1334, the interior surface 1403 of the hinge housing 1301, and the second support plate 1335 bridge this support plane of the first device housing 102 and the support plane of the second device housing 103 in the second position of FIG. 15 to mechanically support the flexible display (121) when the first device housing 102 and the second device housing 103 pivot about the hinge housing 1301 to the axially displaced open position 400 from the closed position 200. In this illustrative embodiment, the first support plate 1334, the interior surface 1403 of the hinge housing 1301, and the second support plate 1335 define a contiguous planar surface spanning the support plane defined by the linear recess (605) of the first device housing 102 and the support plane defined by the linear recess (606) of the second device housing 103 in the closed position 200.

As shown in FIGS. 14 and 15, the hinge housing 1301 and its corresponding support plates 1334,1335 serve two functions: First, they provide mechanical support for the flexible display (121) when the first device housing 102 has pivoted about the hinge housing 1301 relative to the second device housing 103 to an axially displaced open position 400 of FIG. 15. However, when the first device housing 102 pivots about the hinge housing 1301 relative to the second device housing 103 to the closed position 200 of FIG. 14 where the first device housing 102 and the second device housing 103 abut, the support plates 1334,1335 translate along their respective inclined planes 1338,1438 within the first device housing 102 and second device housing 103, respectively, to recede into the first device housing 102 and second device housing 103.

Said differently, when the first device housing 102 pivots about the hinge housing 1301 relative to the second device housing 103 to the closed position 200 of FIG. 14, the support plates 1334,1335 move toward the exterior surfaces 1503,1504 of the first device housing 102 and the second device housing 103, respectively, thereby receding "outward" from the interior surfaces of the first device housing 102 and the second device housing 103. This "collapse" of the first support plate 1334 and the second support plate

1335 creates a cavity in the hinge portion of the electronic device 100 shown in FIG. 14 that allows the flexible display (121) to form the service loop (903). The service loop (903) prevents the flexible display (121) from being damaged or developing memory in the folded position when the electronic device 100 is in the closed position 200 of FIG. 14. Advantageously, hinge mechanisms configured in accordance with one or more embodiments of the disclosure provide a solution that provides the needed system flexibility by providing support for the flexible display (121) when in the axially displaced open position 400 of FIG. 15, but allowing for service loop (903) of the flexible display (121) to occur when the electronic device 100 is in the closed position 200 of FIG. 14.

As can be seen by comparing FIGS. 14-15, in this illustrative embodiment the interior surface 1403 of the hinge housing 1301 is positioned farther outward from the first device housing 102 and the second device housing 103, respectively, when the first device housing 102 and second device housing 103 are pivoted about the hinge housing 1301 to the closed position 200 than when the first device housing 102 and second device housing 103 are pivoted about the hinge housing 1301 to the axially displaced open position 400. As described above with reference to FIG. 13, this occurs due to the fact that the hinge housing 1301 is coupled to a first hinge arm (1302) extending to a first distal hinge arm end comprising a first pin (1324) captively retained within a first translation slot defined by a first bracket (1320) coupled to the first device housing 102 and a second hinge arm (1303) extending to a second distal hinge arm end comprising a second pin (1325) captively retained within a second translation slot defined by a second bracket (1321) coupled to the second device housing 103 such that the first pin (1324) translates within the first translation slot and the second pin (1325) translates within the second translation slot, respectively, when the first device housing 102 housing pivots about the hinge housing 1301 relative to the second device housing 103 between the axially displaced open position 400 and the closed position 200, thereby changing a displacement between the hinge housing 1301 and the first device housing 102 and second device housing 103. Illustrations of how this occurs are presented in FIGS. 16-18.

Turning now to FIGS. 16-18, illustrated therein is another view of the hinge assembly 1300 when assembled for use in the electronic device (100) of FIGS. 1-8. The views of FIGS. 16-18 illustrate the components of the hinge assembly 1300 as they would appear when the electronic device (100) transitions between the closed position 200 and the axially displaced open position 400. FIG. 16 illustrates the hinge assembly 1300 in the closed position 200, while FIG. 18 illustrates the hinge assembly 1300 in the axially displaced open position 400. FIG. 17 illustrates the hinge assembly 1300 in a partially open position 300 or "tent" position.

For simplicity of illustration, the first device housing (102), the second device housing (103), and the flexible display (121) are not shown in FIGS. 16-18. However, one embodiment of the hinge assembly 1300 is shown coupled to the electronic device (100) in FIG. 6 above. This electronic device (100) is shown with the flexible display (121) coupled thereto in FIG. 5. One of ordinary skill in the art having the benefit of this disclosure, when viewing FIGS. 16-18 in the context of FIGS. 5-6 will readily understand how the hinge assembly 1300 couples to the electronic device (100).

In showing the details of the hinge assembly 1300, the operation of the inclined planes (1338,1438) is also obscured. However, this operation was thoroughly described above with reference to FIGS. 14-15 and functions the same here, with those inclined planes (1338,1438) being augmented with, and bounded by, inclined apertures (801,803) within which posts, which are shown extending distally from the distal ends of the support plates (1334,1335) in FIG. 13 insert. This configuration latches and retains the posts within the inclined apertures (801,803), thereby defining an enclosed track within which the posts may travel as the electronic device (100) pivots between the axially displaced open position 400 and the closed position 200. As noted above, while the inclined apertures (801,803) are included in addition to the inclined planes (1338,1438) in the illustrative embodiment of FIGS. 16-18, in other embodiments the inclined apertures (801,803) will be omitted. In still other embodiments, the inclined apertures (801,803) will replace the inclined planes (1338,1438). Other configurations will be obvious to those of ordinary skill in the art having the benefit of this disclosure.

As previously described above with reference to FIGS. 5-6, in one or more embodiments an electronic device (100) into which the hinge assembly 1300 is coupled includes a first device housing (102) and a second device housing (103). A hinge housing 1301 comprising a hinge assembly 101 and couples the first device housing (102) to the second device housing (103). In one or more embodiments, a first bracket 1320 is fixedly coupled to the first device housing (102), while a second bracket 1321 is fixedly coupled to the second device housing (103).

In one or more embodiments, the hinge housing 1301 is coupled to a first hinge arm 1302 and a second hinge arm 1303. The first hinge arm 1302 extends to a first distal hinge arm end 1601 comprising a first pin 1324 captively retained within a translation section 1603 of a slot 1328 defined by a first bracket 1320 coupled to the first device housing (102). The second hinge arm 1303 extends to a second distal hinge arm end 1602 comprising a second pin 1325 captively retained within a translation section 1604 of another slot 1329 defined by a second bracket 1321 coupled to the second device housing (103).

By comparing FIGS. 16-18, it can be seen that the first pin 1324 translates within the translation section 1603 of the first slot 1328, which defines a first translation slot, and the second pin 1325 translates within the translation section 1604 of the second slot 1329, which defines a second translation slot, respectively, when the first bracket 1320, which is coupled to the first device housing (102), pivots about the hinge housing 1301 relative to the second bracket 1321, which is coupled to the second device housing (103), between the axially displaced open position 400 and the closed position 200. By comparing FIGS. 16 and 18, it can be seen that this translation of the first pin 1324 within the translation section 1603 of the first slot 1328 and translation of the second pin 1325 within the translation section 1604 of the second slot 1329 changes a displacement between the hinge housing 1301 and the first device housing (102) to which the first bracket 1320 is coupled and the second device housing (103) to which the second bracket 1321 is coupled.

The displacement is shorter when the first device housing (102) to which the first bracket 1320 is coupled and the second device housing (103) to which the second bracket 1321 is coupled are pivoted about the hinge housing 1301 to the axially displaced open position 400 than when the the first device housing (102) to which the first bracket 1320 is coupled and the second device housing (103) to which the second bracket 1321 is coupled are pivoted to the closed position 200. This is evidenced by the fact that the first pin 1324 situates at a distal end of the translation section 1603 of the first slot 1328 relative to the hinge housing 1301, with the second pin 1325 situating at a distal end of the translation section 1604 of the second slot 1329 relative to the hinge housing 1301, in FIG. 18. By contrast, the first pin 1324 situates at a proximal end of the translation section 1603 of the first slot 1328 relative to the hinge housing 1301, with the second pin 1325 situating at a proximal end of the translation section 1604 of the second slot 1329 relative to the hinge housing 1301, in FIG. 16.

In effect, the first hinge arm 1302 and second hinge arm 1303 extend distally further into the first device housing (102) and second device housing (103), respectively, in the axially displaced open position 400 than in the closed position 200. Looking at it another way, the first bracket 1320 to which the first device housing (102) is coupled and the second bracket 1321 to which the second device housing (103) is coupled are drawn toward the hinge housing 1301 in the axially displaced open position 400 via the translation of the first pin 1324 through the translation section 1603 of the first slot 1328 and the translation of the second pin 1325 through the translation section 1604 of the second slot 1329, respectively, as the hinge assembly 1300 transitions from the closed position 200 to the axially displaced open position 400.

This translation is mechanically the caused by the coupling of the linking arms 1306,1307 between the hinge housing 1301 and each bracket 1320,1321. Illustrating by example, a first linking arm 1306 is coupled between the hinge housing 1301 and the first bracket 1320. Similarly, a second linking arm 1307 is coupled between the hinge housing 1301 and the second bracket 1321.

In one or more embodiments, the linking arms 1306,1307 and the hinge arms 1302,1303 are coupled to the hinge housing 1301 at different pivot centers 1605,1606,1607, 1608. For example, the first hinge arm 1302 pivots about the hinge housing 1301 at a first pivot center 1605, while the first hinge arm 1302 pivots about the hinge housing 1301 at a second pivot center 1603. The second hinge arm 1303 then pivots about the hinge housing 1301 at a third pivot center 1606, while the second linking arm 1307 pivots about the hinge housing 1301 at a fourth pivot center 1608, and so forth. These different pivot centers 1605,1606,1607,1608 function to alter the displacement between the hinge housing 1301 and the first device housing (102) to which the first bracket 1320 is coupled and the second device housing (103) to which the second bracket 1321 is coupled.

As shown in FIGS. 16-18, each hinge arm 1302,1303 couples to a rotating post 1310,1311 that define the first pivot center 1605 and the third pivot center 1606. In one or more embodiments, each rotating post 1310,1311 defines a cross section that is asymmetrical along at least one medial axis that engages a correspondingly asymmetrical aperture defined by its corresponding hinge arm 1302,1303. Illustrating by example, in FIGS. 16-18 each rotating post 1310,1311 includes the number "2" imprinted thereon. As shown in these figures, these rotating posts 1310,1311 are asymmetrical along a medial axis horizontally bisecting the "2" in the middle. In one or more embodiments, the hinge arms 1302,1303 can be laser welded to the rotating posts 1310,1311 to enhance robustness by permanently coupling these components together if necessary. Advantageously, this asymmetric shape of the apertures in the hinge arms 1302,1303 situated about the rotating posts 1310,1311 prevents any wobbling or non-aligned with the pivot center rotation from occurring.

This asymmetry occurs because each rotating post 1310, 1311 defines an "arched" post having one half, i.e., the half including the lower portion of the "2," that is shaped like half a rectangle while the other half, i.e., the half including the upper portion of the "2," has side edges bridged by an arch. Said differently, in one or more embodiments each arched post of the rotating posts 1310,1311 defines a flat major surface on one side and an arched surface on the other side. In one or more embodiments a flat side of the arched post faces the pivot centers 1607,1608 of the linking arms 1306,1307 when the hinge mechanism of the hinge assembly 1300 is in the closed position 200, as is shown in FIG. 16.

These arched posts work as keys within the arched apertures of the hinge arms 1302,1303 so that rotation of the hinge arms 1302,1303 also rotates the rotating posts 1310, 1311. In one or more embodiments, the first hinge arm 1302 defines an arched aperture positioned about the arched post defined by the first rotating post 1310, while the second hinge arm 1303 defines another arched aperture positioned about another arched post defined by the second rotating post 1311. Accordingly, in one or more embodiments each hinge arm 1302,1303 defines an arched aperture positioned about an arched post situated at the end of the rotating posts 1310,1311 having a central axis defining a pivot center for each of the hinge arms 1302,1303. These arched apertures are shown illustratively in FIGS. 16-18.

In FIGS. 16-18, the end covers (1332,1333) that couple to the hinge housing 1301 are removed so that the pivot centers 1607,1608 of the linking arms 1306,1307 can be seen. As shown, the linking arms 1306,1307 couple between these pivot centers 1607,1608 and another pivot center 1609,1610 situated at the first bracket 1320 and the second bracket 1321, respectively. The pivot centers 1607,1608,1609,1610 for the linking arms 1306,1307 that have central axes that are parallel with, but not colinear with, the pivot centers 1605,1606 defined by the rotating posts 1310,1311.

Thus, while the rotating posts 1310,1311 define two pivot centers 1605,1606 (one by an axis passing through rotating posts 1310,1312 about which hinge arms 1302,1303 rotate), the posts extending from the end covers (1332,1333) define other pivot centers 1607,1608 about which linking arms 1306,1307 rotate. As shown in FIGS. 16-18, the axes passing through pivot centers 1605,1606 and through pivot centers 1607,1608 are each parallel, but are not concentrically aligned with any other pivot center axis.

In one explanatory embodiment, a first end of each linking arm 1306,1307 pivots about the posts extending from the end covers (1332,1333), which extend distally inward from interior edge portions of each end cover (1332,1333). In one or more embodiments, the end covers (1332,1333) are separate components from the hinge housing 801 that are coupled to the hinge housing 1301 by screws. However, in other embodiments the end covers (1332,1333) could components of the hinge housing 1301 that are integrally formed with the hinge housing 1301 as a singular component. Where this is the case, a first end of the linking arms 1306,1307 would then couple directly to the hinge housing 1301, with the second end of each linking arm 1306,1307 coupling to each plate 1334,1335. This would result in the first ends of the linking arms 1306,1307 pivoting around posts extending from the hinge housing 1301, while the second ends of the linking arms 1306,1307 pivoting about posts extending from the plates 1334,1335.

As shown in FIG. 16, in one or more embodiments the arched posts defined by the rotating posts 1310,1311 each define at least one flat major surface. In the illustrative embodiment of FIG. 16, the arched posts defined by the rotating posts 1310,1311 define three flat sides—one to the right of the "2," one to the left of the "2," and one beneath the "2." When the hinge assembly 1300 is in the closed position, the flat surface to the right of the "2" imprinted on the first rotating post faces the inner pivot center 1607 of the first linking arm 1306. Similarly, the flat surface to the left of the "2" on the second rotating post faces the inner pivot center 1608 of the second linking arm 1307.

Each of these linking arms 1306,1307 is shown illustratively in FIGS. 16-18 as having a dogleg shape. Just as the term "dogleg" is understood to apply to golf holes that bend to the left or the right, the linking arms 1306,1307 define a dogleg shape in that they are bent like a dog's hind leg. Illustrating by example, the first linking arm 1306 has a dog hip at pivot center 1607 with a dog knee shape and dog ankle shape positioned between this dog hip and the dog toe positioned at pivot center 1609. Similarly, the second linking arm 1307 has a dog hip at pivot center 1608 with a dog knee shape and dog ankle shape positioned between this dog hip and the dog toe positioned at pivot center 1610. Accordingly, in this illustrative embodiment each linking arm 1306,1307 comprises a dogleg linking arm positioned between the respective pivot centers 1607,1608,1609,1610.

As shown in FIGS. 16-18, the first pin 1324 and the second pin 1325 have their pin heads exposed through the translation sections 1603,1604 of the first slot 1328 and the second slot 1329, respectively. These pin heads can be inserted into the first slot 1328 and the second slot 1329, respectively, through the insertion sections 1611,1612 of the first slot 1328 and the second slot 1329. Once passed from the insertion sections 1611,1612 to the translation sections 1603,1604, which are narrower in width than are the insertion sections 1611,1612, the pin heads of the first pin 1324 and the second pin 1325 captively retain the first pin 1324 and the second pin 1325 in the translation sections 1603, 1604 of the first slot 1328 and the second slot 1329, respectively. As previously described, and as shown in FIG. 13, above, in one or more embodiments each of the first pin 1324 and the second pin 1325 define a chamfered rectangular cross section to prevent snags and hang one or more user preferred settings within the translation sections 1603, 1604 of the first slot 1328 and the second slot 1329. In the illustrative embodiment of FIGS. 16-18, each pin head also has a chamfered rectangular cross section, albeit both wider and longer than the cross section of the first pin 1324 and the second pin 1325 to captively retain the first pin 1324 and the second pin 1325 in the first slot 1328 and the second slot 1329, respectively.

As can be seen by the fact that, in FIG. 16, the first pin head engages only the upper outer surface of the translation section 1603 of the first slot 1328 and the second pin head engages only the lower outer surface of the translation section 1604 of the second slot 1329, in this illustrative embodiment each of the first pin 1324 and the second pin 1325 define an L-shaped cross section (sticking out of the page in FIG. 16) with the lower part of the L-shaped cross section extending upward from the first pin 1324 and downward from the second pin 1325. The L-shaped cross section works to avoid friction since the lower part of the L-shaped cross section only passes along one side of the translation sections 1603,1604 of the first slot 1328 and the second slot 1329. However, the first pin 1324 and the second pin 1325 can have other cross sections as well. Illustrating by example, in another embodiment the first pin 1324 and the second pin 1325 could have a T-shaped cross section with the upper part of the T-shaped cross section passing along two sides of the translation sections 1603,1604 of the first slot 1328 and the second slot 1329 as well. Still other configurations will be obvious to those of ordinary skill in the art having the benefit of this disclosure. The use of an L-shaped cross section also helps to make the insertion sections 1611, 1612 of the first slot 1328 and the second slot 1329 smaller as well.

Turning now to FIGS. 19-26, illustrated therein are additional views of the hinge assembly 1300 in action in various forms for completeness. Most of the features and actions of the hinge assembly 1300 have been described above with reference to previous figures. However, the views shown in FIGS. 19-26 provide even more detail, again solely for the sake of thoroughness.

Figure 19:
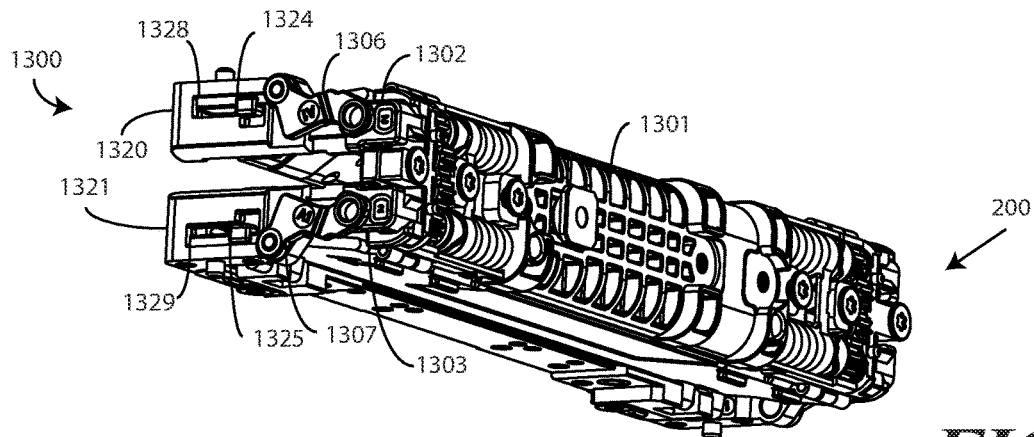
FIG. 19 illustrates another perspective view of one explanatory hinge assembly configured in accordance with one or more embodiments of the disclosure in the closed position.
Figure 20:
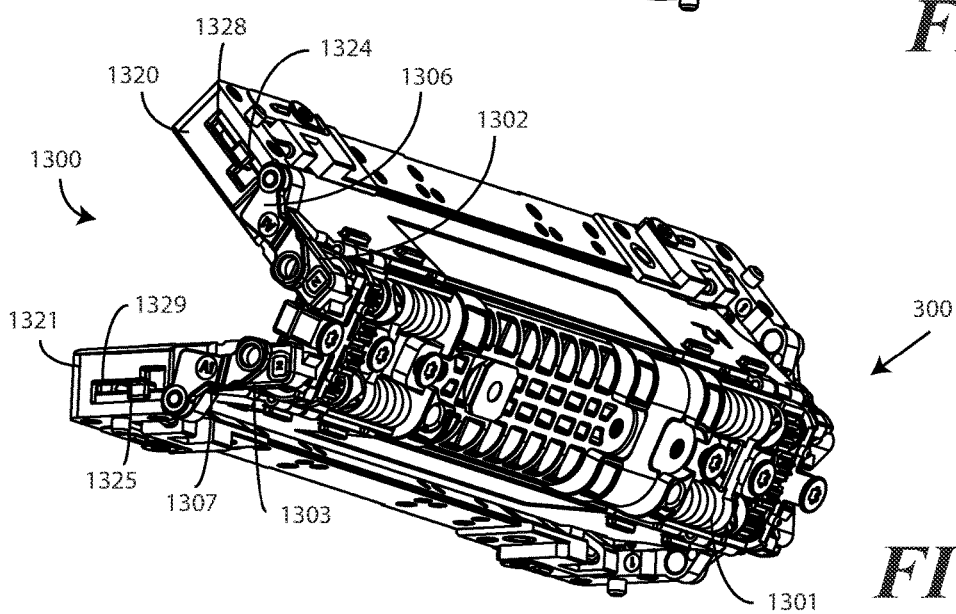
FIG. 20 illustrates another perspective view of one explanatory hinge assembly configured in accordance with one or more embodiments of the disclosure in the partially open position.
Figure 21:
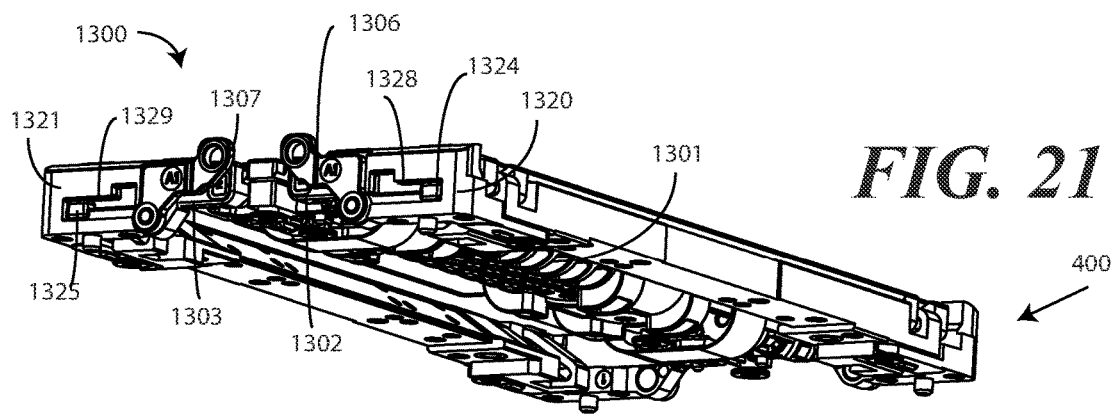
FIG. 21 illustrates another perspective view of one explanatory hinge assembly configured in accordance with one or more embodiments of the disclosure in the axially displaced open position.
Figure 22:
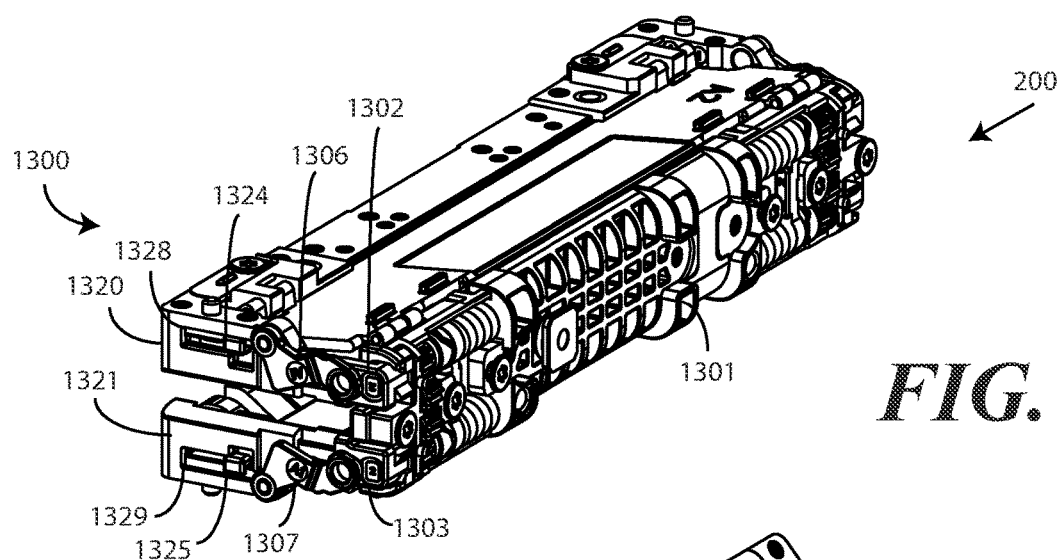
FIG. 22 illustrates a perspective view of one explanatory hinge assembly configured in accordance with one or more embodiments of the disclosure in the closed position.
Figure 23:
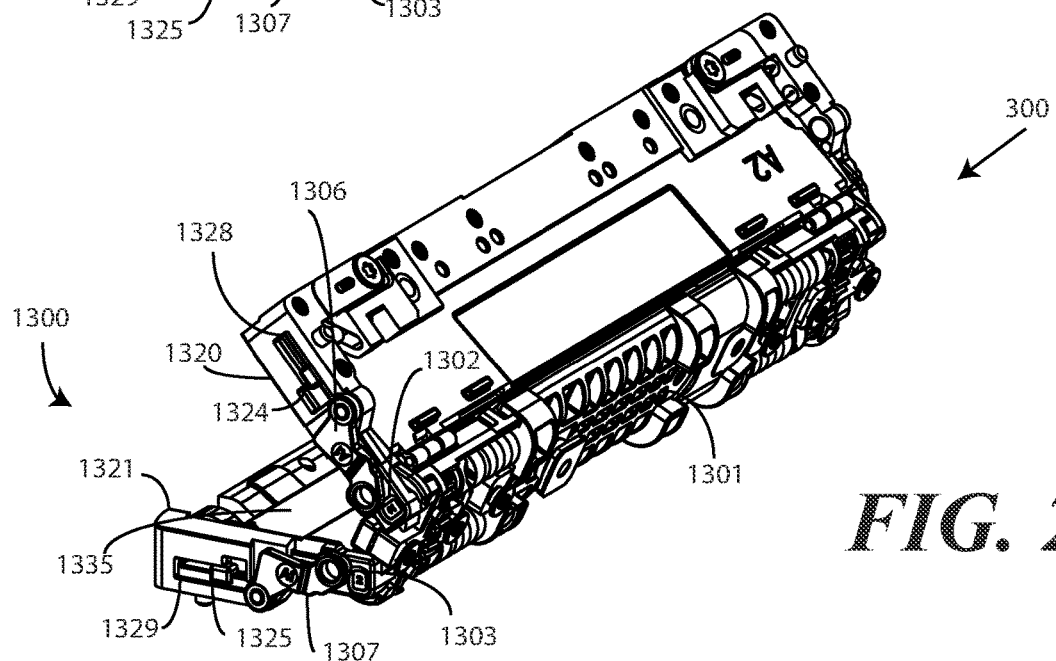
FIG. 23 illustrates a perspective view of one explanatory hinge assembly configured in accordance with one or more embodiments of the disclosure in the partially open position.
Figure 24:
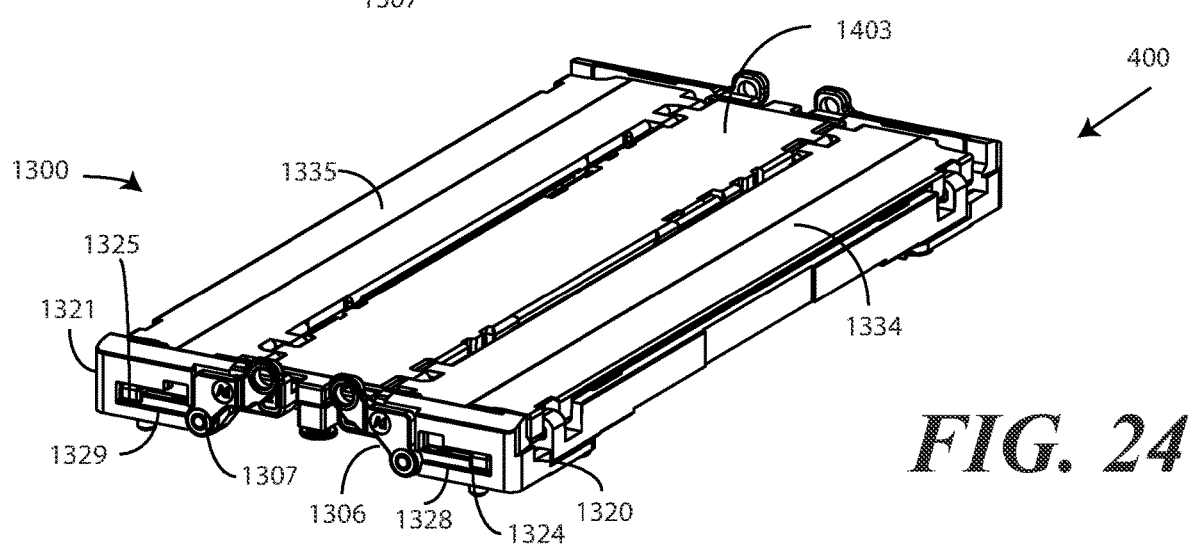
FIG. 24 illustrates a perspective view of one explanatory hinge assembly configured in accordance with one or more embodiments of the disclosure in the axially displaced open position.
Figure 25:
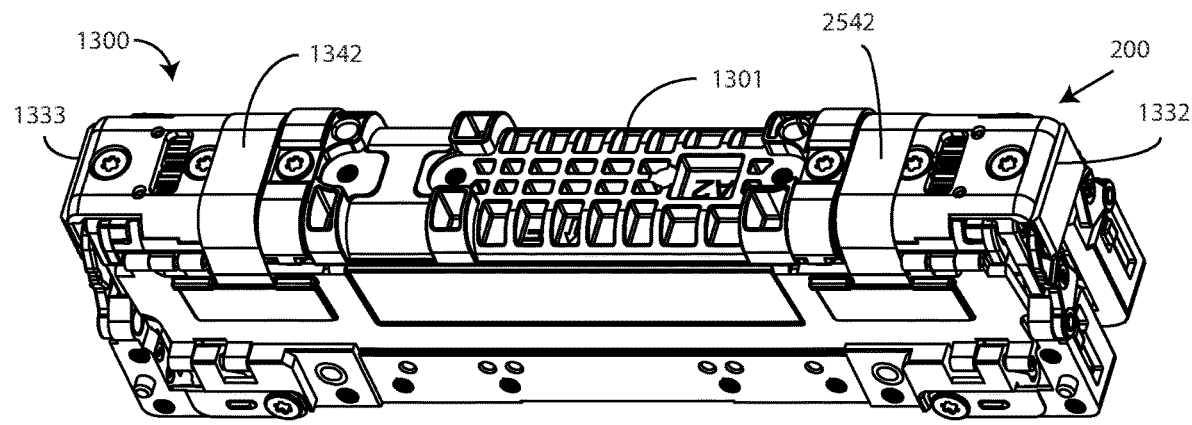
FIG. 25 illustrates still another perspective view of one explanatory hinge assembly configured in accordance with one or more embodiments of the disclosure in the closed position.
Figure 26:
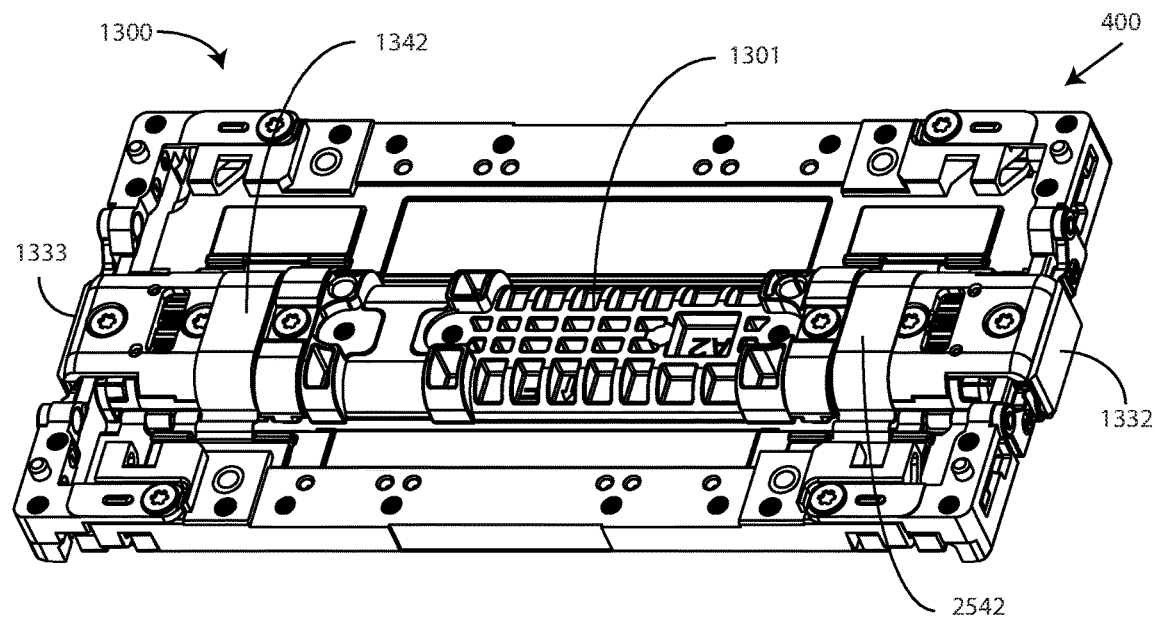
FIG. 26 illustrates still another perspective view of one explanatory hinge assembly configured in accordance with one or more embodiments of the disclosure in the axially displaced open position.

FIGS. 19-20 illustrate perspective views of the hinge assembly 1300 with the end covers (1332,1333) removed in each of the closed position 200, the partially open position 300, and the axially displaced open position 400. FIGS. 22-24 illustrate the same from a different perspective so, for example, the bridging support of the first support plate 1334 and the second support plate 1335, operating in conjunction with the interior surface 1403 of the hinge housing 1301, which is used to support the flexible display (121) can be more easily seen. FIGS. 25-26 show rear perspective views of the hinge assembly 1300 with the end covers 1332,1333 attached in the closed position 200 and the axially displaced open position 400. Again, it should be noted that most of the features and actions of the hinge assembly 1300 have been described above with reference to previous figures.

As shown in these figures, the hinge assembly 1300 is suitable for coupling to a first device housing (102) and a second device housing (103) of an electronic device (100). The hinge assembly 1300 comprises a hinge housing 1301 coupled to a first hinge arm 1302 and a second hinge arm 1303. The first hinge arm 1302 extends to a first distal hinge arm end (1601) comprising a first pin 1324 that is captively retained within a first slot 1328 defined by a first bracket 1320. The second hinge arm 1303 extends to a second distal hinge arm end (1602) comprising a second pin 1325 that is captively retained within a second slot 1329 defined by a second bracket 1321. In one or more embodiments, the first bracket 1320 is coupled to the first device housing (102) of an electronic device (100), while the second bracket 1321 is coupled to the second device housing (103) of the electronic device (100).

As previously described, and as shown in FIGS. 19-24, the first pin 1324 translates within a translation sections (1603) of the first slot 1328 and the second pin 1325 translates within a translation section (1604) of the second slot 1329, respectively, when the first device housing (102) coupled to the first bracket 1320 and the second device housing (103) coupled to the second bracket 1321 pivot about the hinge housing 1301 between the axially displaced open position 400 and the closed position 200, thereby changing a displacement between the first device housing (102) coupled to the first bracket 1320 and the second device housing (103) coupled to the second bracket 1321. In one or more embodiments, the displacement is shorter when the first device housing (102) coupled to the first bracket 1320 and the second device housing (103) coupled to the second bracket 1321 are pivoted about the hinge housing 1301 to the axially displaced open position 400 than when the first device housing (102) coupled to the first bracket 1320 and second device housing (103) coupled to the second bracket 1321 are pivoted about the hinge housing to the closed position 200.

In one or more embodiments, the first hinge arm 1302 and the second hinge arm 1303 translate into the first device housing (102) coupled to the first bracket 1320 and the second device housing (103) coupled to the second bracket 1321, respectively, when the first device housing (102) coupled to the first bracket 1320 pivots about the hinge housing 1301 from the closed position 200 to the axially displaced open position 400. In one or more embodiments, a first linking arm 1306 is coupled between the hinge housing 1301 and the first bracket 1320. Similarly, a second linking arm 1307 is coupled between the hinge housing 1301 and the second bracket 1321. The first bracket 1320 and the second bracket 1321 are pulled toward the hinge housing 1301 by the first linking arm 1306 and the second linking arm 1307 when the hinge assembly 1300 is in the axially displaced open position 400. By contrast, the first bracket 1320 and the second bracket 1321 are pushed away from the hinge housing 1301 by the first linking arm 1306 and the second linking arm 1307 when the hinge assembly 1300 is in the closed position 200.

As best shown in FIGS. 23-24, in one or more embodiments the hinge assembly 1300 includes a first support plate 1334 pivotally coupled to a first side of the hinge housing 1301. In one or more embodiments, the first support plate 1334 extends distally into the first device housing (102) from the first side of the hinge housing 1301 by extending distally into the first bracket 1320.

In one or more embodiments, the hinge assembly 1300 also includes a second support plate 1335 pivotally coupled to a second side of the hinge housing 1301. In one or more embodiments, the second support plate 1335 extends distally into the second device housing (103) from the second side of the hinge housing 1301 by extending distally into the second bracket 1321. As shown in FIGS. 25-26, at least one length of elastic tape 1342 can be coupled to the first support plate 1334 and the second support plate 1335 while passing around or through the hinge housing 1301 to prevent any rattling sounds as the first support plate 1334 and the second support plate 1335 pivot about the hinge housing 1301. In the illustrative embodiment of FIGS. 25-26, the hinge assembly 1300 includes a first length of elastic tape 1342 coupled to the first support plate 1334 and the second support plate 1335 on a first side of the hinge housing 1301 and a second length of elastic tape 2542 coupled to the first support plate 1334 and the second support plate 1335 on a second side of the hinge housing 1301. These lengths of elastic tape 1342,2542 pass around the hinge housing 1301 by passing atop the end covers 1332,1333 in this illustrative embodiment. However, in other embodiments the lengths of elastic tape 1342,2542 could pass through the hinge housing 1301 by passing beneath the end covers 1332,1333. Other arrangements for the lengths of elastic tape will be obvious to those of ordinary skill in the art having the benefit of this disclosure. In the absence of these lengths of elastic tape 1342,2542, tolerances between parts can cause rattling between the intersection points of the hinge housing and first support plate 1334 and the second support plate 1335 as previously described.

Other functions of the hinge assembly 1300 as it passes to or through these positions were fully described above with reference to FIGS. 16-18. However, simply to underscore the operation for clarity, a brief synopsis of the operation of the hinge assembly 1300 will be reprised here.

As previously described, the hinge housing 1301 is coupled to a first device housing (102) and a second device housing (103). The first linking arm 1306 is coupled between a first pivot center (1607) within the hinge housing 1301 and the first bracket 1320 coupled to the first device housing (102). The second linking arm 1307 is coupled to a second pivot center (1608) within the hinge housing 1301 and a second bracket 1321 coupled to the second device housing (103).

The first hinge arm 1302 is pivotally coupled about a third pivot center (1605) within the hinge housing 1301. The first hinge arm 1302 extends into the first device housing (102) to a first hinge arm distal end (1601) having a first hinge arm pin (1324) situated within a translation section (1603) of a slot 1328 defined by the first bracket 1320.

The second hinge arm 1303 is pivotally coupled about a fourth pivot center (1606) within the hinge housing 1301. The second hinge arm 1303 extends into the second device housing (103) to a second hinge arm distal end (1602) having a second hinge arm pin 1325 situated within a translation section (1604) of a second slot 1329 defined by the second bracket 1321.

The first hinge arm 1302 axially pivots about the third pivot center (1605) while the first hinge arm pin 1324 translates linearly within the translation section (1603) of the first slot 1328. The second hinge arm 1303 axially pivots about the fourth pivot center (1606) while the second hinge arm pin 1325 translates linearly within the translation section (1604) of the second slot 1329, respectively, when the first device housing (102) coupled to the first bracket 1320 and the second device housing (103) coupled to the second bracket 1321 pivot about the hinge housing 1301 between the axially displaced open position 400 and the closed position 200.

In one or more embodiments, this changes a displacement between the hinge housing 1301 and the first device housing (102) coupled to the first bracket 1320 and the second device housing (103) coupled to the second bracket 1321. In one or more embodiments, the displacement is shorter when the first device housing (102) coupled to the first bracket 1320 and the the second device housing (103) coupled to the second bracket 1321 are pivoted about the hinge housing 1301 to the axially displaced open position 400 than when the the first device housing (102) coupled to the first bracket 1320 and the second device housing (103) coupled to the second bracket 1321 are pivoted about the hinge housing 1301 to the closed position 200. In particular, the hinge assembly 1300 makes the displacement of the first device housing (102) and the second device housing (103) relative to the hinge housing 1301 shorter when the first device housing (102) and the second device housing (103) are pivoted about the hinge housing 1301 to the axially displaced open position 400 than when the first device housing (102) and second device housing (103) are pivoted about the hinge housing 1301 to the closed position 200.

As shown in FIG. 24, this operative action results in the interior surface 1403 of the hinge housing 1301 being positioned farther from the first device housing (102) coupled to the first bracket 1320 and the second device housing (103) coupled to the second bracket 1321, respectively, when the first device housing (102) coupled to the first bracket 1320 and second device housing (103) coupled to the second bracket 1321 are pivoted about the hinge housing 1301 to the closed position 200 than when the first device housing (102) coupled to the first bracket 1320 and second device housing (103) coupled to the second bracket 1321 are pivoted about the hinge housing 1301 to the axially displaced open position 400. This operative action also results in the first hinge arm pin 1324 and the second hinge arm pin 1325 extending farther into the first bracket 1320 and the second bracket 1321, respectively, as shown in FIG.

24, when the first device housing (102) coupled to the first bracket 1320 is pivoted about the hinge housing 1301 relative to the second device housing (103) coupled to the second bracket 1321 to the axially displaced open position 400 than when the first device housing (102) coupled to the first bracket 1320 is pivoted about the hinge housing 1301 relative to the second device housing (103) coupled to the second bracket 1321 to the closed position, as shown in FIG. 22.

As before, the sliding action, and thus displacement change, is the result of one or more linking arms 1306,1307. Specifically, in FIGS. 19-26 a first linking arm 1306 is coupled between the hinge housing 1301 and the first bracket 1320, while a second linking arm 1307 is coupled between the hinge housing 1301 and the second bracket 1321. As previously described, the first linking arm 1306 and the second linking arm 1307 cause the first hinge arm 1302 and the second hinge arm 1303 to translate into and out of the first bracket 1320 and the second bracket 1321, respectively, when the first device housing (102) and the second device housing (103) pivot about the hinge housing 1301 between the closed position 200 and the axially displaced open position 400.

As mentioned above when describing FIG. 1, not all electronic devices configured in accordance with embodiments of the disclosure employ flexible displays. Accordingly, in other applications it may be desirous to use the hinge mechanisms described with reference to FIGS. 13-26 in an electronic device having rigid displays. One such example is shown in FIG. 27.

Figure 27:
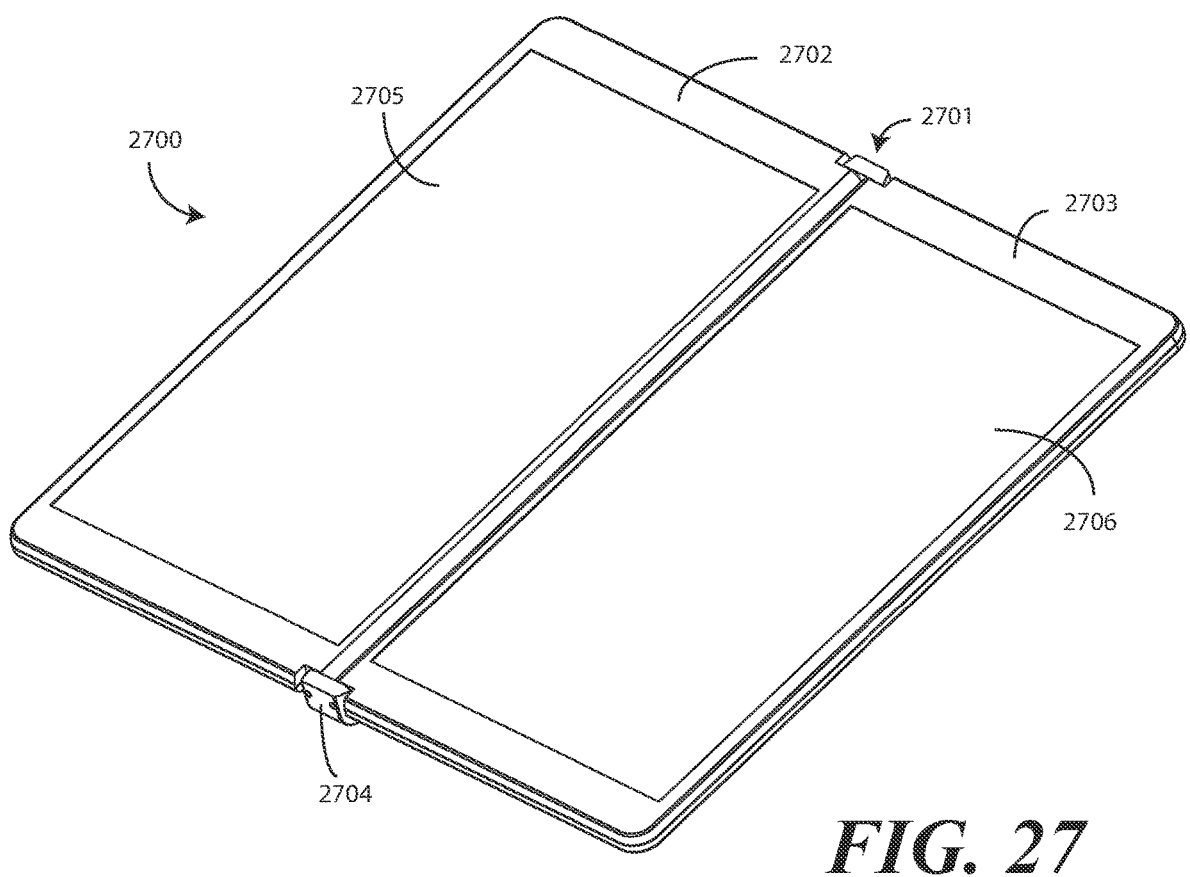
FIG. 27 illustrates an alternate electronic device configured in accordance with one or more embodiments of the disclosure.

Turning now to FIG. 27, illustrated therein is one embodiment where the flexible display and support plates are omitted. As shown in FIG. 27, an electronic device 2700 includes a first device housing 2702 and a second device housing 2703. A hinge 2701, which comprises a hinge body 2704, couples the first device housing 2702 to the second device housing 2703. The first device housing 2702 is pivotable about the hinge 2701 relative to the second device housing 2703 between an axially displaced open position and a closed position, as previously described.

Rather than having a flexible display, in this embodiment the electronic device 2700 includes a first display 2705 coupled to the first device housing 2702 and a second display 2706 coupled to the second device housing 2703. Thus, in addition to separating the first device housing 2702 from the second device housing 2703, the hinge 2701 separates the first display 2705 from the second display 2706 as well.

Figure 28:
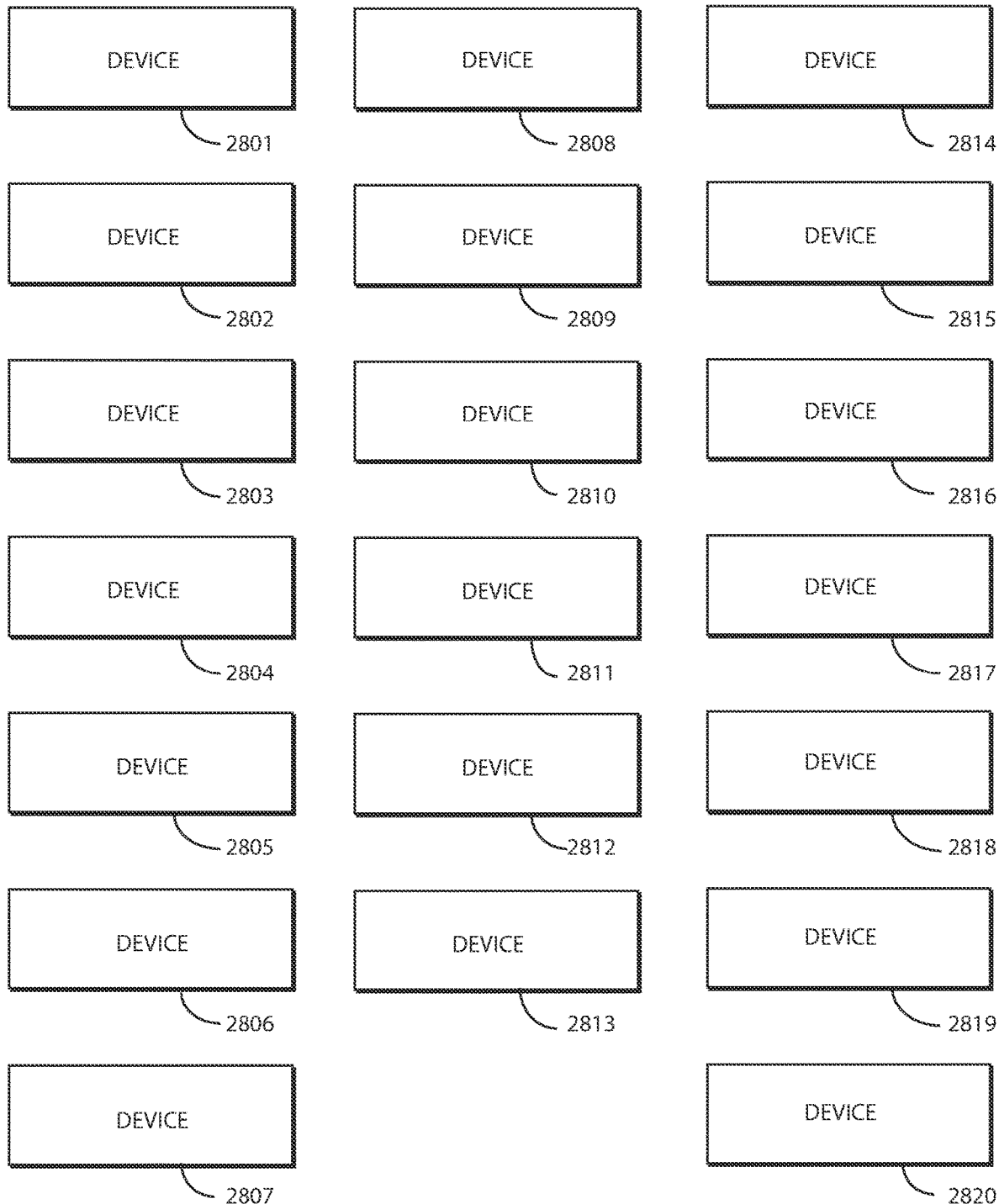
FIG. 28 illustrates various embodiments of the disclosure.

Turning now to FIG. 28, illustrated therein are various embodiments of the disclosure. The embodiments of FIG. 28 are shown as labeled boxes in FIG. 28 due to the fact that the individual components of these embodiments have been illustrated in detail in FIGS. 1-27, which precede FIG. 28. Accordingly, since these items have previously been illustrated and described, their repeated illustration is no longer essential for a proper understanding of these embodiments. Thus, the embodiments are shown as labeled boxes.

At 2801, an electronic device comprises a first device housing and a second device housing. At 2801, the electronic device comprises a hinge housing.

At 2801, the hinge housing is coupled to a first hinge arm extending into to the first device housing. At 2801, the first hinge arm comprises a first pin extending from a terminal edge of the first hinge arm and engaging a first slot defined by a first bracket fixedly coupled to the first device housing.

At 2801, the hinge housing is coupled to a second hinge arm extending into the second device housing. At 2801, the second hinge arm comprises a second pin extending from a terminal edge of the second hinge arm and engaging a second slot defined by a second bracket fixedly coupled to the second device housing.

At 2801, the first pin translates with the first slot and the second pin translates within the second slot, respectively, when the first device housing and the second device housing pivot about the hinge housing between an axially displaced open position and a closed position, thereby changing a displacement between the hinge housing and the first device housing and second device housing. At 2802, the displacement of 2801 is shorter when the first device housing and the second device housing are pivoted about the hinge housing to the axially displaced open position than when the first device housing and second device housing are pivoted about the hinge housing to the closed position.

At 2803, the electronic device of 2802 further comprises a first linking arm coupled between the hinge housing and the first bracket and a second linking arm coupled between the hinge housing and the second bracket. At 2804, the first hinge arm of 2803 pivots about a first pivot center within the hinge housing. At 2804, the first linking arm of 2803 pivots about a second pivot center within the hinge housing. At 2804, the second hinge arm of 2803 pivots about a third pivot center within the hinge housing. At 2804, the second linking arm of 2803 pivots about a fourth pivot center within the hinge housing. At 2804, each the first pivot center, the second pivot center, the third pivot center, and the fourth pivot center are different pivot centers within the hinge housing.

At 2805, the first hinge arm of 2804 defines an arched aperture positioned about an arched post having a central axis at the first pivot center. At 2805, the second hinge arm defines another arched aperture positioned about another arched post having another central axis at the third pivot center.

At 2806, the arched post of 2805 and the other arched post each define a flat major surface facing the second pivot center and the fourth pivot center, respectively. At 2807, the first linking arm and the second linking arm of 2805 each comprise a dogleg linking arm.

At 2808, the first pin of 2804 extends distally from the first hinge arm to a first pin head captively retaining the first pin within a translation section of the first slot. At 2808, the second pin of 2804 extends distally from the second hinge arm to a second pin head captively retaining the second pin within a translation section of the second slot.

At 2809, the first pin and the second pin of 2808 each define a chamfered rectangular cross section. At 2810, the first pin and first pin head of 2808 define an L-shaped cross section.

At 2811, the electronic device of 2801 further comprises a first support plate pivotally coupled to a first side of the hinge housing and extending distally into the first device housing from the first side of the hinge housing. At 2811, the electronic device of 2801 further comprises a second support plate pivotally coupled to a second side of the hinge housing and extending distally into the second device housing from the second side of the hinge housing.

At 2811, a first support plate engaging ramp is coupled to the first bracket and a second support plate engaging ramp is coupled to the second bracket. At 2811, each of the first support plate engaging ramp and the second support plate engaging ramp define an inclined plane.

At 2811, each of the first device housing and the second device housing define a support plate receiving recess. At 2811, a distal end of each of the first support plate and the second support plate travels along the inclined plane between a first support plate position within the first device housing and the second device housing, respectively, with the distal end situated at a top of the inclined plane, to a second support plate position within the first device housing and the second device housing, respectively, with the distal end situated at a bottom of the inclined plane, when the first device housing and the second device housing pivot about the hinge from an axially displaced open position to a closed position.

At 2812, the electronic device of 2188 further comprises at least one elastic tape strip coupled to the first support plate and the second support plate and extending through the hinge housing. At 2813, the electronic device of 2801 further comprises a flexible display spanning the hinge housing. At 2813, a first end of the flexible display fixedly coupled to the first device housing and a second end of the flexible display fixedly coupled to the second device housing.

At 2814, an electronic device comprises a first device housing and a second device housing. At 2814, the electronic device comprises a hinge housing coupled to a first hinge arm extending to a first distal hinge arm end comprising a first pin captively retained within a first translation slot defined by a first bracket coupled to the first device housing. At 2814, the hinge housing comprises a second hinge arm extending to a second distal hinge arm end comprising a second pin captively retained within a second translation slot defined by a second bracket coupled to the second device housing. At 2814, the first pin translates within the first translation slot and the second pin translates within the second translation slot, respectively, when the first device housing pivots about the hinge housing relative to the second device housing between an axially displaced open position and a closed position, thereby changing a displacement between the hinge housing and the first device housing and second device housing.

At 2815, the displacement of 2814 is shorter when the first device housing and the second device housing are pivoted about the hinge housing to the axially displaced open position than when the first device housing and second device housing are pivoted about the hinge housing to the closed position.

At 2816, the first hinge arm and the second hinge arm of 2814 translate into the first device housing and the second device housing, respectively, when the first device housing pivots about the hinge housing from the closed position to the axially displaced open position. At 2817, the electronic device of 2816 further comprises a first linking arm coupled between the hinge housing and the first bracket and a second linking arm coupled between the hinge housing and the second bracket.

At 2818, the electronic device of 2817 further comprises a first support plate pivotally coupled to a first side of the hinge housing and extending distally into the first device housing from the first side of the hinge housing. At 2818, the electronic device of 2817 further comprises a second support plate pivotally coupled to a second side of the hinge housing and extending distally into the second device housing from the second side of the hinge housing. At 2818, the electronic device of 2817 further comprises at least one length of elastic tape coupled to the first support plate and the second support plate and passing through the hinge housing.

At 2819, an electronic device comprises a first device housing and a second device housing. At 2819, the electronic device comprises a hinge housing.

At 2819, the electronic device comprises a first linking arm coupled between a first pivot center within the hinge housing and a first bracket coupled to the first device housing. At 2819, the electronic device comprises a second linking arm coupled to a second pivot center within the hinge housing and a second bracket coupled to the second device housing.

At 2819, the electronic device comprises a first hinge arm pivotally coupled about a third pivot center within the hinge housing. At 2819, the first hinge arm extends into the first device housing to a first hinge arm distal end having a first hinge arm pin situated within a first translation slot defined by the first bracket. At 2819, the electronic device comprises a second hinge arm pivotally coupled about a fourth pivot center within the hinge housing. At 2819, the second hinge arm extends into the second device housing to a second hinge arm distal end having a second hinge arm pin situated within a second translation slot defined by the second bracket.

At 2819, the first hinge arm axially pivots about the third pivot center while the first hinge arm pin translates linearly within the first translation slot and the second hinge arm axially pivots about the fourth pivot center while the second hinge arm pin translates linearly within the second translation slot, respectively, when the first device housing and the second device housing pivot about the hinge housing between an axially displaced open position and a closed position. At 2918, this action changes a displacement between the hinge housing and the first device housing and second device housing. At 2820, the displacement is shorter when the first device housing and the second device housing are pivoted about the hinge housing to the axially displaced open position than when the first device housing and second device housing are pivoted about the hinge housing to the closed position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a first device housing and a second device housing;
a hinge housing;
a first linking arm coupled between a first pivot center within the hinge housing and a first bracket coupled to the first device housing;
a second linking arm coupled to a second pivot center within the hinge housing and a second bracket coupled to the second device housing;
a first hinge arm pivotally coupled about a third pivot center within the hinge housing, the first hinge arm extending into the first device housing to a first hinge arm distal end having a first hinge arm pin situated within a first translation slot defined by the first bracket; and a second hinge arm pivotally coupled about a fourth pivot center within the hinge housing and extending into the second device housing to a second hinge arm distal end having a second hinge arm pin situated within a second translation slot defined by the second bracket;

wherein the first hinge arm axially pivots about the third pivot center while the first hinge arm pin translates linearly within the first translation slot and the second hinge arm axially pivots about the fourth pivot center while the second hinge arm pin translates linearly within the second translation slot, respectively, when the first device housing and the second device housing pivot about the hinge housing between an axially displaced open position and a closed position, thereby changing a displacement between the hinge housing and the first device housing and second device housing.

2. The electronic device of claim 1, wherein the displacement is shorter when the first device housing and the second device housing are pivoted about the hinge housing to the axially displaced open position than when the first device housing and second device housing are pivoted about the hinge housing to the closed position.

3. The electronic device of claim 1, further comprising a flexible display spanning the hinge housing.

4. The electronic device of claim 3, the flexible display defining a service loop when the first device housing and the second device housing are pivoted about the hinge housing to the closed position.

5. The electronic device of claim 1, further comprising one or more tensioning springs causing the first device housing and the second device housing to situate at one or more predefined angles relative to each other.

6. The electronic device of claim 1, the electronic device comprising a smartphone.

7. The electronic device of claim 1, further comprising interlocking gears causing a symmetrical rotation of the first device housing and the second device housing about the hinge housing.

8. The electronic device of claim 1, wherein the third pivot center and the fourth pivot center are each defined by a rotating post.

9. The electronic device of claim 8, wherein the rotating post defines a cross section that is asymmetrical along at least one medial axis.

10. The electronic device of claim 9, wherein the first hinge arm and the second hinge arm each define an asymmetrical aperture engaging the rotating post.

11. The electronic device of claim 10, wherein rotation of the asymmetrical aperture causes rotation of the rotating post.

12. The electronic device of claim 1, further comprising a first support plate pivotally coupled to a first side of the hinge housing and a second support plate pivotally coupled to a second side of the hinge housing.

13. The electronic device of claim 12, further comprising a flexible display spanning the hinge housing, wherein the first support plate and the second support plate provide mechanical support for the flexible display when the first device housing and the second device housing are pivoted to the axially displaced open position.

14. The electronic device of claim 13, wherein the first support plate and the second support plate allow the flexible display to define a service loop when the first device housing and the second device housing are pivoted to the closed position.

15. The electronic device of claim 13, further comprising at least one elastic tape strip coupled to the first support plate and the second support plate and extending through the hinge housing.

16. The electronic device of claim 1, further comprising a flexible display coupled to the first device housing and a second display coupled to the second device housing.

17. The electronic device of claim 1, wherein the first hinge arm pin and the second hinge arm pin each define an L-shaped cross section.

18. The electronic device of claim 1, wherein the first hinge arm pin and the second hinge arm pin are captively held within the first translation slot and the second translation slot, respectively.

19. The electronic device of claim 1, wherein the first linking arm and the second linking arm each comprise a dogleg linking arm.

20. The electronic device of claim 1, further comprising a decorative cover attached to the hinge housing.

* * * * *